(12) United States Patent
Sullivan et al.

(10) Patent No.: US 10,683,169 B2
(45) Date of Patent: Jun. 16, 2020

(54) AUTOMATED BOT TRANSFER ARM DRIVE SYSTEM

(71) Applicant: SYMBOTIC, LLC, Wilmington, MA (US)

(72) Inventors: Robert Sullivan, Wilmington, MA (US); Stephen C. Toebes, Chelmsford, MA (US)

(73) Assignee: Symbotic, LLC, Wilmington, MA (US)

( * ) Notice: Subject to any disclaimer, the term of this patent is extended or adjusted under 35 U.S.C. 154(b) by 0 days.

(21) Appl. No.: 16/351,374

(22) Filed: Mar. 12, 2019

(65) Prior Publication Data

US 2019/0210803 A1    Jul. 11, 2019

Related U.S. Application Data

(63) Continuation of application No. 15/913,719, filed on Mar. 6, 2018, now Pat. No. 10,227,177, which is a continuation of application No. 15/359,204, filed on Nov. 22, 2016, now Pat. No. 9,908,698, which is a continuation of application No. 13/326,993, filed on Dec. 15, 2011, now Pat. No. 9,499,338.

(60) Provisional application No. 61/423,388, filed on Dec. 15, 2010.

(51) Int. Cl.
*B65G 1/04* (2006.01)
(52) U.S. Cl.
CPC .................. *B65G 1/0492* (2013.01)
(58) Field of Classification Search
CPC .................................................. B65G 1/0492
See application file for complete search history.

(56) References Cited

U.S. PATENT DOCUMENTS

| 1,845,962 | A | 2/1932 | Dorr |
| 1,887,667 | A | 11/1932 | Wheeler |
| 2,606,508 | A | 8/1952 | Nes |
| 2,656,995 | A | 10/1953 | Wolf |
| 2,673,689 | A | 3/1954 | Bonanno |

(Continued)

FOREIGN PATENT DOCUMENTS

| CN | 2752234 | 1/2006 |
| CN | 2920788 | 7/2007 |

(Continued)

OTHER PUBLICATIONS

International Search Report, International Application No. PCT/US2011/065238, dated Mar. 21, 2012.

*Primary Examiner* — Kyle O Logan
(74) *Attorney, Agent, or Firm* — Perman & Green, LLP

(57) ABSTRACT

An autonomous transport vehicle including a transfer arm including at least one finger and a movable finger support member, at least one sensor configured to detect movement of the at least one finger, the at least one sensor having a registration member and a detection member where one of the registration member and detection member is mounted to each of the at least one finger so as to be movable with a respective one of the at least one finger and the other one of the registration member and detection member is stationary relative to the at least one finger, and a controller in communication with the at least one sensor, the controller being configured to determine a position of the at least one finger along the second direction based on a proximity of the registration member relative to the detection member.

14 Claims, 8 Drawing Sheets

(56) References Cited

U.S. PATENT DOCUMENTS

| | | |
|---|---|---|
| 2,792,234 A | 5/1957 | Page |
| 2,840,248 A | 6/1958 | Grove et al. |
| 2,877,575 A | 3/1959 | Stedt |
| 2,923,421 A | 2/1960 | Roumefort |
| 2,945,604 A | 7/1960 | Kroll |
| 2,996,621 A | 8/1961 | Barrett |
| 3,161,303 A | 12/1964 | Burrows |
| 3,162,459 A | 12/1964 | Marmorine et al. |
| 3,269,744 A | 8/1966 | Dobson |
| 3,369,648 A | 2/1968 | Wentz |
| 3,370,492 A | 2/1968 | Treff |
| 3,512,625 A | 5/1970 | Burgess et al. |
| 3,519,149 A | 7/1970 | Saul |
| 3,554,390 A | 1/1971 | Saul |
| 3,636,586 A | 1/1972 | Bollinger et al. |
| 3,677,421 A | 7/1972 | Kintner |
| 3,732,828 A | 5/1973 | Wanner |
| 3,737,056 A | 6/1973 | Hathcock |
| 3,738,506 A | 6/1973 | Cornford et al. |
| 3,744,945 A | 7/1973 | Metrailer |
| 3,746,189 A | 7/1973 | Burch et al. |
| 3,751,758 A | 8/1973 | Higbee et al. |
| 3,774,543 A | 11/1973 | Welsh |
| 3,782,565 A | 1/1974 | Doran et al. |
| 3,789,765 A | 2/1974 | Schultz |
| 3,802,580 A | 4/1974 | Castaldi |
| 3,811,383 A | 5/1974 | Butzow |
| 3,822,647 A | 7/1974 | Hill et al. |
| 3,850,111 A | 11/1974 | Hansen |
| 3,876,087 A | 4/1975 | Osta |
| 3,876,095 A | 4/1975 | Stedt |
| 3,896,955 A | 7/1975 | Collins et al. |
| 3,904,216 A | 9/1975 | Metrailer |
| 3,940,105 A | 2/1976 | Metrailer |
| 3,970,840 A | 7/1976 | De Bruine |
| 3,976,302 A | 8/1976 | Hammarstrand |
| 3,984,012 A | 10/1976 | Ennis et al. |
| 4,007,843 A | 2/1977 | Lubbers et al. |
| 4,026,365 A | 5/1977 | Andersson et al. |
| 4,037,291 A | 7/1977 | Huempfner et al. |
| 4,057,019 A | 11/1977 | Shaffer |
| 4,064,986 A | 12/1977 | Bertovich |
| 4,072,203 A | 2/1978 | Pierson |
| 4,079,955 A | 3/1978 | Thorpe et al. |
| 4,087,116 A | 5/1978 | Morimoto |
| 4,174,854 A | 11/1979 | Spicka et al. |
| 4,183,304 A | 1/1980 | Forster |
| 4,213,396 A | 7/1980 | Mehren et al. |
| 4,214,535 A | 7/1980 | Gerhard |
| 4,219,296 A | 8/1980 | Fujii et al. |
| 4,223,611 A | 9/1980 | Dawson et al. |
| 4,265,582 A | 5/1981 | Theobald |
| 4,268,207 A | 5/1981 | Pipes |
| 4,271,764 A | 6/1981 | Braun et al. |
| 4,273,234 A | 6/1981 | Bourgeois |
| 4,307,988 A | 12/1981 | Page et al. |
| 4,346,659 A | 8/1982 | Binder |
| 4,349,937 A | 9/1982 | Fontana |
| 4,349,938 A | 9/1982 | Fontana |
| 4,353,572 A | 10/1982 | McCain |
| 4,372,219 A | 2/1983 | Gibbs |
| 4,372,724 A | 2/1983 | Stolzer |
| 4,394,104 A | 7/1983 | Camerini et al. |
| 4,395,181 A | 7/1983 | Loomer |
| 4,406,570 A | 9/1983 | Duncan et al. |
| 4,428,708 A | 1/1984 | Burt |
| 4,445,440 A | 5/1984 | Geiss |
| 4,459,078 A | 7/1984 | Chiantella et al. |
| 4,470,742 A | 9/1984 | Schindler |
| 4,492,504 A | 1/1985 | Hainsworth |
| 4,505,630 A | 3/1985 | Kaschner et al. |
| 4,527,486 A | 7/1985 | Baird et al. |
| 4,538,950 A | 9/1985 | Shiomi et al. |
| 4,621,526 A | 11/1986 | Carr et al. |
| 4,678,390 A | 7/1987 | Bonneton et al. |
| 4,679,149 A | 7/1987 | Merz |
| 4,715,662 A | 12/1987 | van Zanten et al. |
| 4,716,530 A | 12/1987 | Ogawa et al. |
| 4,726,725 A | 2/1988 | Baker et al. |
| 4,733,740 A | 3/1988 | Bigowsky et al. |
| 4,750,429 A | 6/1988 | Mordaunt et al. |
| 4,773,807 A | 9/1988 | Kroll et al. |
| 4,786,229 A | 11/1988 | Henderson |
| 4,811,229 A | 3/1989 | Wilson |
| 4,812,985 A | 3/1989 | Hambrick et al. |
| 4,856,956 A | 8/1989 | Zur |
| 4,862,807 A | 9/1989 | Guadagno |
| 4,878,876 A | 11/1989 | Ishimoto |
| 4,883,401 A | 11/1989 | Kavieff |
| 4,887,016 A | 12/1989 | Malick |
| 4,905,783 A | 3/1990 | Bober |
| 4,909,697 A | 3/1990 | Bernard et al. |
| 4,936,738 A | 6/1990 | Brennan et al. |
| 4,942,826 A | 7/1990 | Erickson |
| 4,966,242 A | 10/1990 | Baillargeon |
| 4,966,513 A | 10/1990 | Motoda |
| 4,993,905 A | 2/1991 | Potocnjak |
| 5,002,449 A | 3/1991 | Kita et al. |
| 5,004,399 A | 4/1991 | Sullivan et al. |
| 5,015,145 A | 5/1991 | Angell et al. |
| 5,069,592 A | 12/1991 | Galperin |
| 5,096,355 A | 3/1992 | Schroder |
| 5,134,353 A | 7/1992 | Kita et al. |
| 5,134,940 A | 8/1992 | Fujita et al. |
| 5,135,344 A | 8/1992 | Kita et al. |
| 5,140,787 A | 8/1992 | Corcoran |
| 5,149,654 A | 9/1992 | Gross et al. |
| 5,156,639 A | 10/1992 | Bostrom |
| 5,163,001 A | 11/1992 | Luke, Jr. |
| 5,165,838 A | 11/1992 | Kallansrude et al. |
| 5,168,815 A | 12/1992 | Comer et al. |
| 5,179,329 A | 1/1993 | Nishikawa et al. |
| 5,187,664 A | 2/1993 | Yardley et al. |
| 5,199,840 A | 4/1993 | Castaldi et al. |
| 5,213,463 A | 5/1993 | Rothlisberger et al. |
| 5,218,909 A | 6/1993 | Ng |
| 5,219,264 A | 6/1993 | McClure et al. |
| 5,226,782 A | 7/1993 | Rigling |
| 5,238,100 A | 8/1993 | Rose et al. |
| 5,265,944 A | 11/1993 | Gloceri |
| 5,271,703 A | 12/1993 | Lindqvist et al. |
| 5,273,392 A | 12/1993 | Bernard et al. |
| 5,281,901 A | 1/1994 | Yardley et al. |
| 5,286,157 A | 2/1994 | Vainio et al. |
| 5,307,888 A | 5/1994 | Urvoy |
| 5,327,354 A | 7/1994 | Tsujimoto |
| 5,328,316 A | 7/1994 | Hoffmann |
| 5,333,982 A | 8/1994 | Tanizawa et al. |
| 5,333,983 A | 8/1994 | Hatouchi et al. |
| 5,337,880 A | 8/1994 | Claycomb et al. |
| 5,362,197 A | 11/1994 | Rigling |
| 5,370,492 A | 12/1994 | Gleyze et al. |
| 5,377,851 A | 1/1995 | Asano et al. |
| 5,377,910 A | 1/1995 | Newton et al. |
| 5,379,229 A | 1/1995 | Parsons et al. |
| 5,380,139 A | 1/1995 | Pohjonen et al. |
| 5,388,955 A | 2/1995 | Schroder |
| 5,397,212 A | 3/1995 | Watanabe et al. |
| 5,403,147 A | 4/1995 | Tanaka |
| 5,405,232 A | 4/1995 | Lloyd et al. |
| 5,410,969 A | 5/1995 | Rene et al. |
| 5,418,732 A | 5/1995 | McFadin |
| 5,421,265 A | 6/1995 | Sugimoto et al. |
| 5,421,685 A | 6/1995 | Elmer et al. |
| 5,421,697 A | 6/1995 | Ostwald |
| 5,425,612 A | 6/1995 | Ebstein |
| 5,434,490 A | 7/1995 | Ishida et al. |
| 5,445,485 A | 8/1995 | Poulet |
| 5,450,797 A | 9/1995 | Becker et al. |
| 5,460,476 A | 10/1995 | Gazza |
| 5,472,309 A | 12/1995 | Bernard et al. |
| 5,501,295 A | 3/1996 | Muller et al. |
| 5,525,884 A | 6/1996 | Sugiura et al. |
| 5,529,165 A | 6/1996 | Shubert |

(56) References Cited

U.S. PATENT DOCUMENTS

| | | |
|---|---|---|
| 5,548,516 A | 8/1996 | Gudat et al. |
| 5,564,880 A | 10/1996 | Lederer |
| 5,588,796 A | 12/1996 | Ricco et al. |
| 5,601,395 A | 2/1997 | Lichti et al. |
| 5,611,422 A | 3/1997 | Harkonen |
| 5,615,992 A | 4/1997 | Proske et al. |
| 5,626,362 A | 5/1997 | Mottola |
| 5,632,350 A | 5/1997 | Gauvin |
| 5,650,703 A | 7/1997 | Yardley et al. |
| 5,664,688 A | 9/1997 | Kitanaka et al. |
| 5,667,230 A | 9/1997 | Riley et al. |
| 5,668,724 A | 9/1997 | Ehret et al. |
| 5,707,199 A | 1/1998 | Faller |
| 5,718,322 A | 2/1998 | Mulhern |
| 5,718,551 A | 2/1998 | Ebstein |
| 5,725,063 A | 3/1998 | Ceragioli et al. |
| 5,743,562 A | 4/1998 | Mottola |
| 5,764,014 A | 6/1998 | Jakeway et al. |
| 5,801,506 A | 9/1998 | Netzler |
| 5,802,980 A | 9/1998 | Hofmiller |
| 5,806,870 A | 9/1998 | Hull et al. |
| 5,810,540 A | 9/1998 | Castaldi |
| 5,829,096 A | 11/1998 | Perry |
| 5,833,431 A | 11/1998 | Rosse et al. |
| 5,839,872 A | 11/1998 | Goto et al. |
| 5,847,537 A | 12/1998 | Parmley |
| 5,857,413 A | 1/1999 | Ward |
| 5,866,469 A | 2/1999 | Hays |
| 5,918,951 A | 7/1999 | Rudd |
| 5,927,926 A | 7/1999 | Yagi et al. |
| 5,928,058 A | 7/1999 | Francis et al. |
| 5,988,306 A | 11/1999 | Ooishi |
| 6,000,502 A | 12/1999 | Leasor et al. |
| 6,021,367 A | 2/2000 | Pilutti et al. |
| 6,024,381 A | 2/2000 | Mottola |
| 6,036,427 A | 3/2000 | Kita et al. |
| 6,038,501 A | 3/2000 | Kawakami |
| 6,061,607 A | 5/2000 | Bradley et al. |
| 6,062,942 A | 5/2000 | Ogihara |
| 6,116,842 A | 9/2000 | Harris et al. |
| 6,135,697 A | 10/2000 | Isaacs et al. |
| 6,149,366 A | 11/2000 | Deandrea |
| 6,158,566 A | 12/2000 | Pollock |
| 6,220,676 B1 | 4/2001 | Rudd |
| 6,257,597 B1 | 7/2001 | Galazin |
| 6,272,406 B2 | 8/2001 | Alofs et al. |
| 6,324,994 B1 | 12/2001 | Glenn |
| 6,325,586 B1 | 12/2001 | Loy |
| 6,341,269 B1 | 1/2002 | Dulaney et al. |
| 6,345,217 B1 | 2/2002 | Zeitler et al. |
| 6,352,035 B1 | 3/2002 | Kashiwase et al. |
| 6,354,430 B1 | 3/2002 | Oe |
| 6,360,673 B1 | 3/2002 | Herrin et al. |
| 6,389,981 B1 | 5/2002 | Strothmann et al. |
| 6,390,756 B1 | 5/2002 | Isaacs et al. |
| 6,391,226 B1 | 5/2002 | Chauvette et al. |
| 6,425,723 B1 | 7/2002 | Okada et al. |
| 6,439,131 B1 | 8/2002 | Higgins |
| 6,439,955 B1 | 8/2002 | Feketo |
| 6,503,043 B1 | 1/2003 | Smith et al. |
| 6,508,102 B1 | 1/2003 | Margolis et al. |
| 6,563,128 B2 | 5/2003 | Lublin et al. |
| 6,600,418 B2 | 7/2003 | Francis et al. |
| 6,601,435 B2 | 8/2003 | Hong |
| 6,629,502 B2 | 10/2003 | Matsukawa |
| 6,631,321 B1 | 10/2003 | Ciprian |
| 6,645,355 B2 | 11/2003 | Hanson et al. |
| 6,652,213 B1 | 11/2003 | Mitchell et al. |
| 6,655,297 B2 | 12/2003 | Kawato et al. |
| 6,692,211 B2 | 2/2004 | Yuyama et al. |
| 6,695,328 B2 | 2/2004 | Cope |
| 6,721,638 B2 | 4/2004 | Zeitler |
| 6,748,292 B2 | 6/2004 | Mountz |
| 6,763,767 B2 | 7/2004 | Jackson et al. |
| 6,808,058 B2 | 10/2004 | Shiohara |
| 6,851,921 B2 | 2/2005 | Haag |
| 6,861,154 B2 | 3/2005 | Olson et al. |
| 6,864,489 B2 | 3/2005 | Chen et al. |
| 6,880,202 B2 | 4/2005 | Thompson et al. |
| 6,928,336 B2 | 8/2005 | Peshkin et al. |
| 6,929,440 B1 | 8/2005 | Grond |
| 6,948,899 B2 | 9/2005 | Lee |
| 6,950,722 B2 | 9/2005 | Mountz |
| 6,988,451 B2 | 1/2006 | Marcotte et al. |
| 6,997,665 B2 | 2/2006 | Bouche et al. |
| 7,002,698 B2 | 2/2006 | Hanson et al. |
| 7,002,772 B2 | 2/2006 | Yardy |
| 7,003,375 B2 | 2/2006 | Inui |
| 7,008,164 B2 | 3/2006 | Rokkaku |
| 7,011,487 B2 | 3/2006 | Kafka et al. |
| 7,017,228 B2 | 3/2006 | Silverstein et al. |
| 7,025,191 B2 | 4/2006 | Lichti et al. |
| 7,058,866 B2 | 6/2006 | Flanagan et al. |
| 7,074,151 B2 | 7/2006 | Thompson |
| 7,085,097 B2 | 8/2006 | Starr et al. |
| 7,100,294 B1 | 9/2006 | Goldsobel et al. |
| 7,101,139 B1 | 9/2006 | Benedict |
| 7,102,848 B2 | 9/2006 | Kumpon et al. |
| 7,110,855 B2 | 9/2006 | Leishman |
| 7,119,982 B2 | 10/2006 | Starr et al. |
| 7,128,196 B2 | 10/2006 | Oldford et al. |
| 7,128,521 B2 | 10/2006 | Hansl |
| 7,135,992 B2 | 11/2006 | Karlsson et al. |
| 7,137,593 B2 | 11/2006 | Baatz |
| 7,145,478 B2 | 12/2006 | Goncalves et al. |
| 7,145,747 B2 | 12/2006 | Brace et al. |
| 7,155,308 B2 | 12/2006 | Jones |
| 7,184,855 B2 | 2/2007 | Stingel et al. |
| 7,192,034 B2 | 3/2007 | Radke et al. |
| 7,221,998 B2 | 5/2007 | Brust et al. |
| 7,266,422 B1 | 9/2007 | DeMotte et al. |
| 7,319,320 B2 | 1/2008 | Kawashima et al. |
| 7,329,081 B2 | 2/2008 | Baker et al. |
| 7,381,022 B1 | 6/2008 | King |
| 7,386,379 B2 | 6/2008 | Naik et al. |
| 7,402,018 B2 | 7/2008 | Mountz et al. |
| 7,426,970 B2 | 9/2008 | Olsen |
| 7,433,759 B2 | 10/2008 | Nangoy |
| 7,495,561 B2 | 2/2009 | Bodin et al. |
| 7,506,404 B2 | 3/2009 | Block et al. |
| 7,520,376 B2 | 4/2009 | Bar |
| 7,536,283 B2 | 5/2009 | Potter et al. |
| 7,539,557 B2 | 5/2009 | Yamauchi |
| 7,584,812 B2 | 9/2009 | Radke et al. |
| 7,587,260 B2 | 9/2009 | Bruemmer et al. |
| 7,591,630 B2 | 9/2009 | Lert |
| 7,620,477 B2 | 11/2009 | Bruemmer |
| 7,636,982 B2 | 12/2009 | Jones et al. |
| 7,641,014 B2 | 1/2010 | Hu |
| 7,648,002 B2 | 1/2010 | Easton et al. |
| 7,661,920 B2 | 2/2010 | Kantola et al. |
| 7,668,621 B2 | 2/2010 | Bruemmer |
| 7,671,293 B2 | 3/2010 | Fry et al. |
| 7,682,122 B2 | 3/2010 | Maynard et al. |
| 7,686,560 B2 | 3/2010 | Laurin et al. |
| 7,689,318 B2 | 3/2010 | Draper |
| 7,695,235 B1 | 4/2010 | Rallis |
| 7,730,781 B2 | 6/2010 | Zhang et al. |
| 7,751,928 B1 | 7/2010 | Antony et al. |
| 7,769,513 B2 | 8/2010 | Breed et al. |
| 7,771,152 B2 | 8/2010 | Waltersbacher |
| 7,792,350 B2 | 9/2010 | Kiley et al. |
| 7,793,742 B2 | 9/2010 | Donaldson et al. |
| 7,801,644 B2 | 9/2010 | Bruemmer et al. |
| 7,826,919 B2 | 11/2010 | D'Andrea et al. |
| 7,826,926 B2 | 11/2010 | Myeong et al. |
| 7,861,844 B2 | 1/2011 | Hayduchok et al. |
| 7,866,671 B2 | 1/2011 | Madler |
| 7,885,750 B2 | 2/2011 | Lu |
| 7,909,562 B2 | 3/2011 | Mead |
| 7,926,145 B2 | 4/2011 | Liao |
| 7,931,431 B2 | 4/2011 | Benedict et al. |
| 7,960,973 B2 | 6/2011 | Zeller et al. |
| 7,965,871 B2 | 6/2011 | Ihara et al. |

(56) References Cited

U.S. PATENT DOCUMENTS

| | | | |
|---|---|---|---|
| 7,967,354 B2 | 6/2011 | Faulkner et al. |
| 7,974,738 B2 | 7/2011 | Bruemmer et al. |
| 7,991,505 B2 | 8/2011 | Lert et al. |
| 8,000,835 B2 | 8/2011 | Friz et al. |
| 8,001,837 B2 | 8/2011 | Larson et al. |
| 8,006,824 B2 | 8/2011 | Wada et al. |
| 8,007,221 B1 | 8/2011 | More et al. |
| 8,024,066 B2 | 9/2011 | Reverte et al. |
| 8,031,086 B2 | 10/2011 | Thacher et al. |
| 8,041,456 B1 | 10/2011 | Blackwell et al. |
| 8,042,627 B2 | 10/2011 | Yang et al. |
| 8,060,257 B2 | 11/2011 | Close et al. |
| 8,136,650 B2 | 3/2012 | Frich et al. |
| 8,280,548 B2 | 10/2012 | Zuber et al. |
| 8,364,309 B1 | 1/2013 | Bailey |
| 8,378,825 B2 | 2/2013 | Dahms et al. |
| 8,425,173 B2 | 4/2013 | Lert et al. |
| 8,480,347 B2 | 7/2013 | Schafer |
| 8,515,575 B2 | 8/2013 | Pfeiffer |
| 8,594,835 B2 | 11/2013 | Lert et al. |
| 8,965,619 B2 | 2/2015 | Sullivan et al. |
| 9,020,639 B2 | 4/2015 | Bewley et al. |
| 9,037,286 B2 | 5/2015 | Lert |
| 9,327,903 B2 | 5/2016 | Toebes et al. |
| 2002/0029719 A1 | 3/2002 | Matsukawa |
| 2002/0037208 A1 | 3/2002 | Patrito |
| 2002/0076307 A1 | 6/2002 | Fallin et al. |
| 2003/0033217 A1 | 2/2003 | Cutlip |
| 2003/0051544 A1 | 3/2003 | Hong |
| 2003/0074125 A1 | 4/2003 | Walenty et al. |
| 2003/0185656 A1 | 10/2003 | Hansl |
| 2003/0200129 A1 | 10/2003 | Klaubauf et al. |
| 2004/0093116 A1 | 5/2004 | Mountz |
| 2004/0136821 A1* | 7/2004 | Berger | E02F 3/433 |
| | | | 414/699 |
| 2004/0167667 A1 | 8/2004 | Goncalves et al. |
| 2004/0238326 A1 | 12/2004 | Lichti |
| 2005/0029029 A1 | 2/2005 | Thorne |
| 2005/0047895 A1 | 3/2005 | Lert |
| 2005/0095095 A1 | 5/2005 | Hansl |
| 2005/0131645 A1 | 6/2005 | Panopoulos |
| 2005/0151360 A1 | 7/2005 | Bertrand et al. |
| 2005/0166787 A1 | 8/2005 | Astrom |
| 2005/0212478 A1 | 9/2005 | Takenaka |
| 2005/0217532 A1 | 10/2005 | Conneally |
| 2005/0238455 A1 | 10/2005 | Toteff |
| 2005/0238465 A1 | 10/2005 | Ruazumov |
| 2006/0018996 A1 | 1/2006 | Pollock et al. |
| 2006/0058921 A1 | 3/2006 | Okamoto |
| 2006/0104712 A1 | 5/2006 | Bufano et al. |
| 2006/0210382 A1 | 9/2006 | Mountz et al. |
| 2006/0216137 A1 | 9/2006 | Sakata et al. |
| 2006/0232025 A1 | 10/2006 | Braud |
| 2006/0245862 A1 | 11/2006 | Hansel et al. |
| 2006/0257236 A1 | 11/2006 | Stingel et al. |
| 2007/0021864 A1 | 1/2007 | Mountz et al. |
| 2007/0059132 A1 | 3/2007 | Akamatsu et al. |
| 2007/0065258 A1 | 3/2007 | Benedict et al. |
| 2007/0071585 A1 | 3/2007 | Henkel |
| 2007/0125727 A1 | 6/2007 | Winkler |
| 2007/0177011 A1 | 8/2007 | Lewin et al. |
| 2007/0276535 A1 | 11/2007 | Haag |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2007/0297879 A1* | 12/2007 | Yuyama | A61G 12/001 |
| | | | 414/279 |
| 2008/0001372 A1 | 1/2008 | Hoffman et al. |
| 2008/0065265 A1 | 3/2008 | Ozick et al. |
| 2008/0154429 A1 | 6/2008 | Lee et al. |
| 2008/0161987 A1 | 7/2008 | Breed |
| 2008/0166217 A1 | 7/2008 | Fontana |
| 2008/0215180 A1 | 9/2008 | Kota |
| 2008/0269960 A1 | 10/2008 | Kostmann |
| 2008/0275609 A1 | 11/2008 | Boydell |
| 2008/0281717 A1 | 11/2008 | Kortelainen |
| 2009/0074545 A1* | 3/2009 | Lert, Jr. | B65G 1/0492 |
| | | | 414/276 |
| 2009/0099879 A1 | 4/2009 | Ouimet |
| 2009/0114115 A1 | 5/2009 | Minges |
| 2009/0185884 A1 | 7/2009 | Wurman et al. |
| 2009/0188774 A1 | 7/2009 | Tsujimoto |
| 2009/0216366 A1 | 8/2009 | Zuber et al. |
| 2009/0265031 A1 | 10/2009 | Tachibana et al. |
| 2010/0043665 A1 | 2/2010 | Brigham |
| 2010/0044124 A1 | 2/2010 | Radke et al. |
| 2010/0044977 A1 | 2/2010 | Hughes et al. |
| 2010/0076591 A1 | 3/2010 | Lert |
| 2010/0086385 A1 | 4/2010 | Shani |
| 2010/0102532 A1 | 4/2010 | Timoney et al. |
| 2010/0131182 A1 | 5/2010 | Deegan et al. |
| 2010/0135759 A1 | 6/2010 | Dillon |
| 2010/0141483 A1 | 6/2010 | Thacher et al. |
| 2010/0145507 A1* | 6/2010 | Blust | G07F 11/165 |
| | | | 700/232 |
| 2010/0167556 A1 | 7/2010 | Totsu et al. |
| 2010/0218697 A1 | 9/2010 | Sugimoto |
| 2010/0224427 A1 | 9/2010 | Nuchter et al. |
| 2010/0234995 A1 | 9/2010 | Zini et al. |
| 2010/0272546 A1 | 10/2010 | Wolkerstorfer |
| 2010/0286905 A1 | 11/2010 | Goncalves et al. |
| 2010/0290874 A1 | 11/2010 | Wolkerstorfer |
| 2010/0316468 A1 | 12/2010 | Lert et al. |
| 2010/0316469 A1 | 12/2010 | Lert et al. |
| 2010/0324815 A1 | 12/2010 | Hiruta et al. |
| 2011/0008138 A1 | 1/2011 | Yamashita |
| 2011/0068943 A1 | 3/2011 | Lane |
| 2011/0090064 A1 | 4/2011 | Dahms et al. |
| 2011/0106339 A1 | 5/2011 | Phillips et al. |
| 2011/0130974 A1 | 6/2011 | Yngve et al. |
| 2011/0176895 A1 | 7/2011 | Kortelainen |
| 2011/0185975 A1 | 8/2011 | Berg et al. |
| 2011/0202175 A1 | 8/2011 | Romanov et al. |
| 2011/0231016 A1 | 9/2011 | Goulding |
| 2011/0271469 A1 | 11/2011 | Ziegler et al. |
| 2012/0099953 A1 | 4/2012 | Hortig et al. |
| 2012/0185122 A1 | 7/2012 | Sullivan et al. |
| 2012/0186192 A1 | 7/2012 | Tobes et al. |
| 2012/0189409 A1 | 7/2012 | Toebes et al. |
| 2012/0189416 A1 | 7/2012 | Toebes et al. |
| 2012/0247239 A1 | 10/2012 | Hortig et al. |
| 2012/0277940 A1 | 11/2012 | Kumar et al. |
| 2012/0299260 A1 | 11/2012 | Goertzen et al. |
| 2013/0061420 A1 | 3/2013 | Vanderstegen-Drake et al. |
| 2013/0094926 A1 | 4/2013 | Olszak et al. |
| 2013/0142599 A1 | 6/2013 | McDowell et al. |
| 2014/0350725 A1 | 11/2014 | Lafary et al. |
| 2015/0081089 A1 | 3/2015 | Kapust et al. |
| 2015/0150429 A1 | 6/2015 | Yoo et al. |
| 2015/0314446 A1 | 11/2015 | Day et al. |
| 2015/0336741 A1 | 11/2015 | Ahammer et al. |
| 2016/0000282 A1 | 1/2016 | Vanderstegen-Drake et al. |
| 2016/0121486 A1 | 5/2016 | Lipinski et al. |
| 2016/0214808 A1 | 7/2016 | Cyrulik et al. |
| 2017/0083020 A1 | 3/2017 | Purwin et al. |
| 2017/0320522 A1 | 11/2017 | Lorenz et al. |

FOREIGN PATENT DOCUMENTS

| | | |
|---|---|---|
| DE | 20011661 | 12/2000 |
| DE | 10142395 | 11/2002 |
| EP | 0466004 | 1/1992 |
| EP | 04990276 | 8/1992 |
| EP | 0647575 | 4/1995 |
| EP | 0737630 | 10/1996 |
| EP | 1193195 | 4/2002 |
| EP | 1598291 | 11/2005 |
| EP | 1627830 | 2/2006 |
| EP | 1775240 | 4/2007 |
| EP | 2852006 | 3/2015 |
| JP | 6337007 | 2/1988 |
| JP | 63160204 | 10/1988 |
| JP | 1179321 | 3/1993 |
| JP | 061309 | 1/1994 |

(56) References Cited

FOREIGN PATENT DOCUMENTS

| | | |
|---|---|---|
| JP | 07157013 | 6/1995 |
| JP | 07187330 | 7/1995 |
| JP | 081553 | 1/1996 |
| JP | 08091795 | 4/1996 |
| JP | 08113321 | 5/1996 |
| JP | 08133426 | 5/1996 |
| JP | 08258763 | 10/1996 |
| JP | 0948507 | 2/1997 |
| JP | 11124298 | 5/1999 |
| JP | 11180697 | 7/1999 |
| JP | 2000118615 | 4/2000 |
| JP | 2000122720 | 4/2000 |
| JP | 2001344020 | 12/2001 |
| JP | 2002356207 | 12/2001 |
| JP | 2003063610 | 3/2003 |
| JP | 2003321102 | 11/2003 |
| JP | 2004043109 | 2/2004 |
| JP | 2005082331 | 3/2005 |
| JP | 2005138956 | 6/2005 |
| JP | 2005206259 | 8/2005 |
| JP | 2006160523 | 6/2006 |
| JP | 2007283958 | 11/2007 |
| JP | 2008023639 | 2/2008 |
| JP | 2008238959 | 2/2008 |
| JP | 2008510673 | 4/2008 |
| JP | 2008100825 | 5/2008 |
| JP | 2009513457 | 4/2009 |
| JP | 2010049987 | 3/2010 |
| JP | 2007131383 | 5/2017 |
| TW | 506936 | 10/2002 |
| TW | 588712 | 5/2004 |
| TW | 201003347 | 1/2010 |
| WO | 0187648 | 11/2001 |
| WO | 2005009324 | 2/2005 |
| WO | 2005056943 | 6/2005 |
| WO | 2006024035 | 3/2006 |
| WO | 2006095047 | 9/2006 |
| WO | 2007011814 | 1/2007 |
| WO | 2008152245 | 12/2008 |
| WO | 2009098573 | 8/2009 |
| WO | 2009106988 | 9/2009 |
| WO | 2010080539 | 7/2010 |
| WO | 2010118412 | 10/2010 |

* cited by examiner

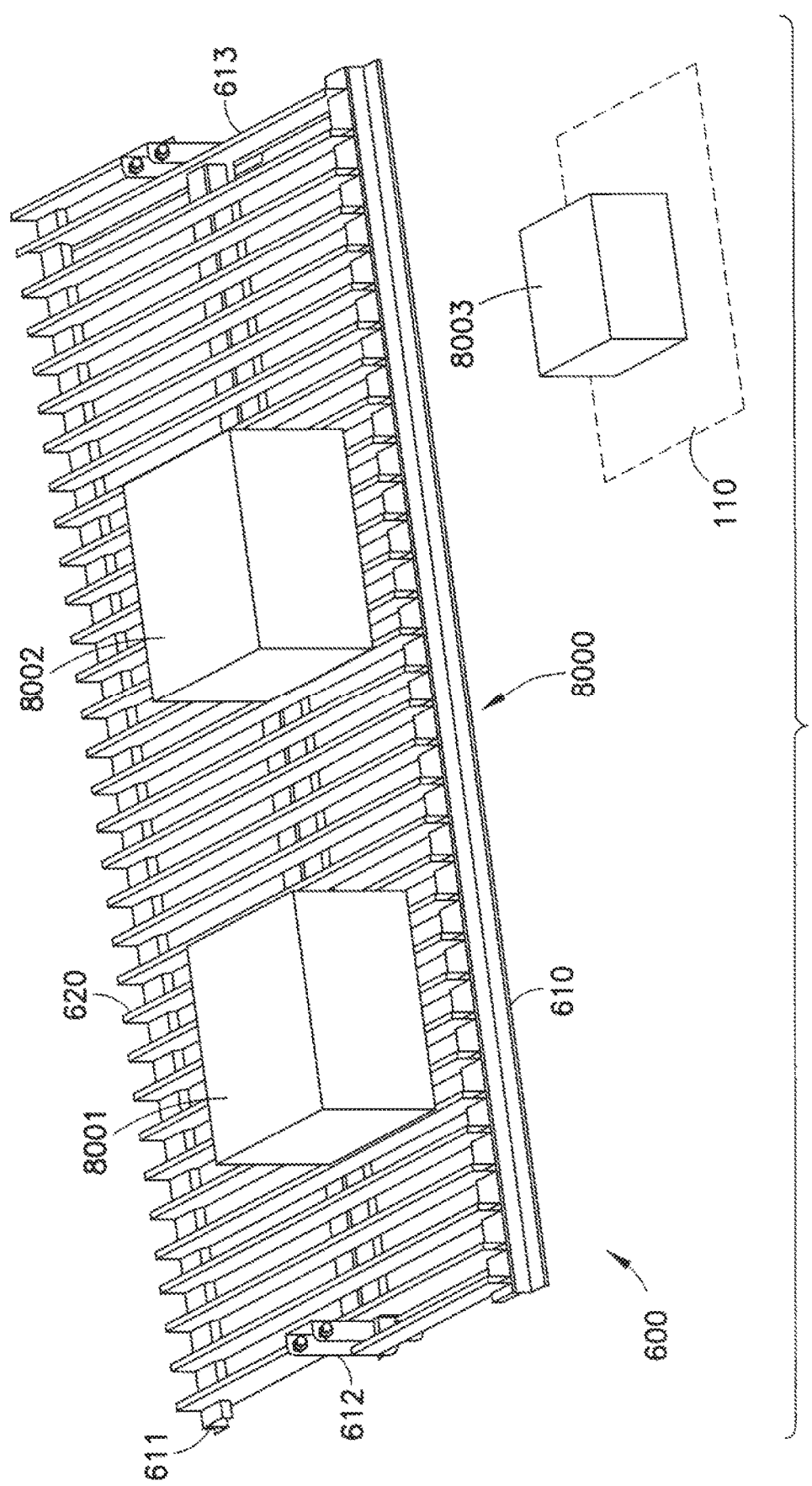

AUTOMATED BOT TRANSFER ARM DRIVE SYSTEM

CROSS-REFERENCE TO RELATED APPLICATION(S)

This application is a continuation of U.S. patent application Ser. No. 15/913,719 filed Mar. 6, 2018 (now U.S. Pat. No. 10,227,177, issued Mar. 12, 2019), which is a continuation of the U.S. patent application Ser. No. 15/359,204, filed on Nov. 22, 2016 (now U.S. Pat. No. 9,908,698, issued Mar. 6, 2018), which is a continuation of U.S. patent application Ser. No. 13/326,993, filed on Dec. 15, 2011 (now U.S. Pat. No. 9,499,338, issued Nov. 22, 2016) which is a non-provisional of and claims the benefit of and priority to U.S. Provisional Patent Application No. 61/423,388, filed on Dec. 15, 2010, the disclosures of which are incorporated by reference herein in their entireties.

BACKGROUND

1. Field

The embodiments generally relate to storage and retrieval systems and, more particularly, to autonomous transports of the storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the items transported to/from and stored on the storage racks are contained in carriers, for example storage containers such as trays, totes or shipping cases, or on pallets.

When transporting the cases to and from the storage racks with automated transports it would be advantageous to be able to control fingers of the automated transports' transfer arms with a simplified drive system for picking and placing case units to storage locations or conveyor locations.

BRIEF DESCRIPTION OF THE DRAWINGS

The foregoing aspects and other features of the disclosed embodiments are explained in the following description, taken in connection with the accompanying drawings, wherein:

FIGS. 2A and 2B illustrate storage shelves in accordance with aspects of the disclosed embodiment;

DETAILED DESCRIPTION OF THE EXEMPLARY EMBODIMENT(s)

Figure 1:
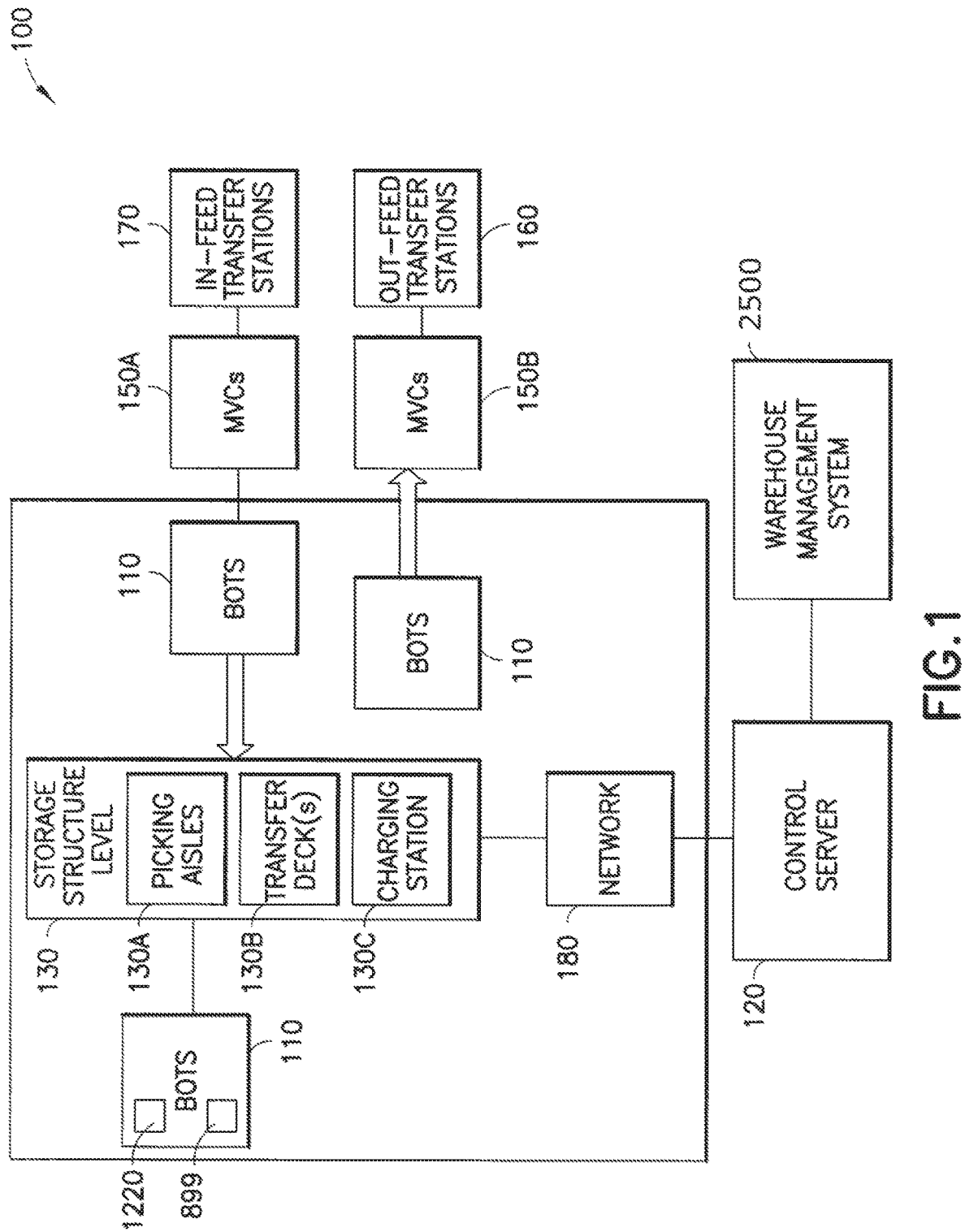
FIG. 1 schematically illustrates an exemplary storage and retrieval system in accordance with an aspect of the disclosed embodiment.

FIG. 1 schematically illustrates an exemplary storage and retrieval system in accordance with the embodiments. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with the embodiments the storage and retrieval system 100 may be substantially similar to that described in, for example, U.S. patent application Ser. No. 12/757,381, filed on Apr. 9, 2010 (now U.S. Pat. No. 8,740,538), U.S. patent application Ser. No. 14/293,556, filed on Jun. 2, 2014 (now U.S. Pat. No. 9,725,239), U.S. Provisional Patent Application No. 61/423,340, filed on Dec. 15, 2010, and U.S. patent application Ser. No. 13/326, 674, filed on Dec. 15, 2011, the disclosures of which are incorporated by reference herein in their entireties and may operate in a retail distribution center or warehouse to, for example, fulfill orders received from retail stores for case units (where case units as used herein means items not stored in trays, on totes or on pallets, e.g. uncontained or items stored in trays, totes or on pallets). It is noted that the case units may include cases of items (e.g. case of soup cans, boxes of cereal, etc.) or individual items that are adapted to be taken off of or placed on a pallet. In accordance with the embodiments, shipping cases or case units (e.g. cartons, barrels, boxes, crates, jugs, totes, pallets or any other suitable device for holding case units) may have variable sizes and may be used to hold items in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). It is noted that the storage and retrieval system described herein may be applied to any environment in which case units are stored and retrieved.

The storage and retrieval system 100 may be configured for installation in, for example, existing warehouse structures or adapted to new warehouse structures. The storage and retrieval system may include in-feed and out-feed transfer stations 170, 160, multilevel vertical conveyors 150A, 150B, a storage structure 130, and a number of autonomous transport vehicles or robots 110 (referred to herein as "bots"). It is noted that the storage and retrieval system may also include robot or bot transfer stations (as described in, for example, U.S. patent application Ser. No. 12/757,220, filed on Apr. 9, 2010 (now U.S. Pat. No. 9,096,375) and U.S. patent application Ser. No. 14/816,804, filed on Aug. 3, 2015, the disclosures of which are incorporated by reference herein in their entireties) that may provide an indirect interface between the bots 110 and the multilevel vertical conveyor 150A, 150B. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors are described herein as being dedicated inbound or in-feed conveyors 150A and outbound or out-feed conveyors 150B, each of the conveyors 150A, 150B may be used for both inbound and outbound transfer of case units/items from the storage and retrieval system. The multilevel vertical conveyors may be any suitable lifting devices for transporting case units between levels of the storage and retrieval system. It is noted that while multilevel vertical conveyors are described herein in other aspects the conveyors may be any suitable conveyors or transfer/picking devices having any suitable transport path orientation. Some non-limiting suitable examples of multilevel vertical conveyors can be found in U.S. Provisional Patent Application No. 61/423,298, filed on Dec. 15, 2010, U.S. patent application Ser. No. 13/327,088, filed on Dec. 15, 2011 (now U.S. Pat. No. 8,998,554), U.S. patent application Ser. No. 14/679,535, filed on Apr. 6, 2015 (now U.S. Pat. No. 9,371,183), and U.S. patent application Ser. No. 12/757,354, filed on Apr. 9, 2010 (now U.S. Pat. No. 9,694,975), the disclosures of which are incorporated by reference herein in their entireties and U.S. patent application Ser. No. 12/757,220, filed on Apr. 9, 2010 (now U.S. Pat. No. 9,096,375), and U.S. patent application Ser. No. 14/816,804, filed on Aug. 3, 2015 (previously incorporated by reference). For example, the multilevel vertical conveyors may have any suitable number of support shelves for transporting the case units to a predetermined level of the storage and retrieval system. The support shelves may have slatted supports configured to allow fingers of the bots 110 or in-feed/out-feed transfer stations 170, 160 to pass between the slats for transferring case units to and from the conveyor. It is noted that in the embodiments the transfer of case units between the bots 110 and the multilevel vertical conveyors may occur in any suitable manner.

As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s) can be transferred from a multilevel vertical conveyor 150A, 150B to each storage space on a respective level and from each storage space to any one of the multilevel vertical conveyors 150A, 150B on a respective level. The bots 110 may be configured to transfer the case units between the storage spaces and the multilevel vertical conveyors with one pick (e.g. substantially directly between the storage spaces and the multilevel vertical conveyors). By way of further example, the designated bot 110 picks the case unit(s) from a shelf of a multilevel vertical conveyor, transports the case unit(s) to a predetermined storage area of the storage structure 130 and places the case unit(s) in the predetermined storage area (and vice versa).

The bots 110 may be configured to place case units, such as the above described retail merchandise, into picking stock in the one or more levels of the storage structure 130 and then selectively retrieve ordered items for shipping the ordered items to, for example, a store or other suitable location. In the embodiments, the bots 110 may interface in any suitable manner with the multilevel vertical conveyors 150A, 150B such as through, for example, extension of a transfer arm or effector of the bot (which may have fingers for interfacing with slatted support shelves of the multi-level vertical conveyors) relative to a frame of the bot. Suitable examples of bots are described in U.S. patent application Ser. No. 12/757,312, filed on Apr. 9, 2010 (now U.S. Pat. No. 8,425,173), U.S. patent application Ser. No. 13/860,802, filed on Apr. 11, 2013 (now U.S. Pat. No. 9,321,591), U.S. patent application Ser. No. 15/137,889, filed on Apr. 25, 2016, U.S. Provisional Patent Application No. 61/423,220, filed on Dec. 15, 2010, U.S. patent application Ser. No. 13/327,040, filed on Dec. 15, 2011 (now U.S. Pat. No. 9,187,244), U.S. patent application Ser. No. 14/942,717, filed on Nov. 16, 2015 (now U.S. Pat. No. 9,676,551), U.S. Provisional Patent Application No. 61/423,365, filed on Dec. 15, 2010, U.S. patent application Ser. No. 13/326,952, filed on Dec. 15, 2011, U.S. Provisional Patent Application No. 61/423,359, filed on Dec. 15, 2010, U.S. patent application Ser. No. 13/326,447, filed on Dec. 15, 2011 (now U.S. Pat. No. 8,965,619), U.S. patent application Ser. No. 14/629,003, filed on Feb. 23, 2015 (now U.S. Pat. No. 9,423,796), U.S. Provisional Patent Application No. 61/423,206, filed on Dec. 15, 2010, U.S. patent application Ser. No. 13/327,035, filed on Dec. 15, 2011 (now U.S. Pat. No. 9,008,884), U.S. patent application Ser. No. 14/684,715, filed on Apr. 13, 2015 (now U.S. Pat. No. 9,309,050), and U.S. patent application Ser. No. 15/094,214, filed on Apr. 8, 2016, the disclosures of which are incorporated by reference herein in their entireties.

The storage structure 130 may include multiple levels of storage rack modules where each level includes an array of storage spaces (arrayed on the multiple levels and in multiple rows on each level), picking aisles 130A formed between the rows of storage spaces, and transfer decks 130B. It is noted that each level may also include respective bot transfer stations for providing an indirect interface between the bots and the multilevel vertical conveyors. In the embodiments, the picking aisles 130A and transfer decks 130B may be arranged for allowing the bots 110 to traverse respective levels of the storage structure 130 for placing case units into picking stock and to retrieve the ordered case units. As may be realized, the storage and retrieval system may be configured to allow random accessibility to the storage spaces. For example, all storage spaces in the storage structure 130 may be treated substantially equally when determining which storage spaces are to be used when picking and placing case units from/to the storage structure 130 such that any storage space of sufficient size can be used to store items. The storage structure 130 of the embodiments may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning). It is noted that the storage and retrieval system may also be configured so that each multilevel vertical conveyor serves a predetermined area of the array of storage spaces.

The storage structure 130 may also include charging stations 130C for replenishing, for example, a battery pack of the bots 110. The charging stations 130C may be located at, for example, transfer areas 295 (FIG. 2) of the transfer deck 130B so that the bots 110 can substantially simultaneously transfer items, for example, to and from a multilevel vertical conveyor 150A, 150B while being charged. The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in the embodiments, the system control server 120 may be configured to manage and coordinate the overall operation of the storage and retrieval system 100 and interface with, for example, a warehouse management system 125, which in turn manages the warehouse facility as a whole. The control server 120 may be substantially similar to that described in, for example, U.S. patent application Ser. No. 12/757,337, filed on Apr. 9, 2010 (now U.S. Pat. No. 8,594,835), U.S. patent application Ser. No. 14/089,434, filed on Nov. 25, 2013 (now U.S. Pat. No. 9,051,120), and U.S. patent application Ser. No. 14/733,341, filed on Jun. 8, 2015 (now U.S. Pat. No. 9,771,217), the disclosures of which are incorporated by reference herein in their entireties.

Figure 2B:
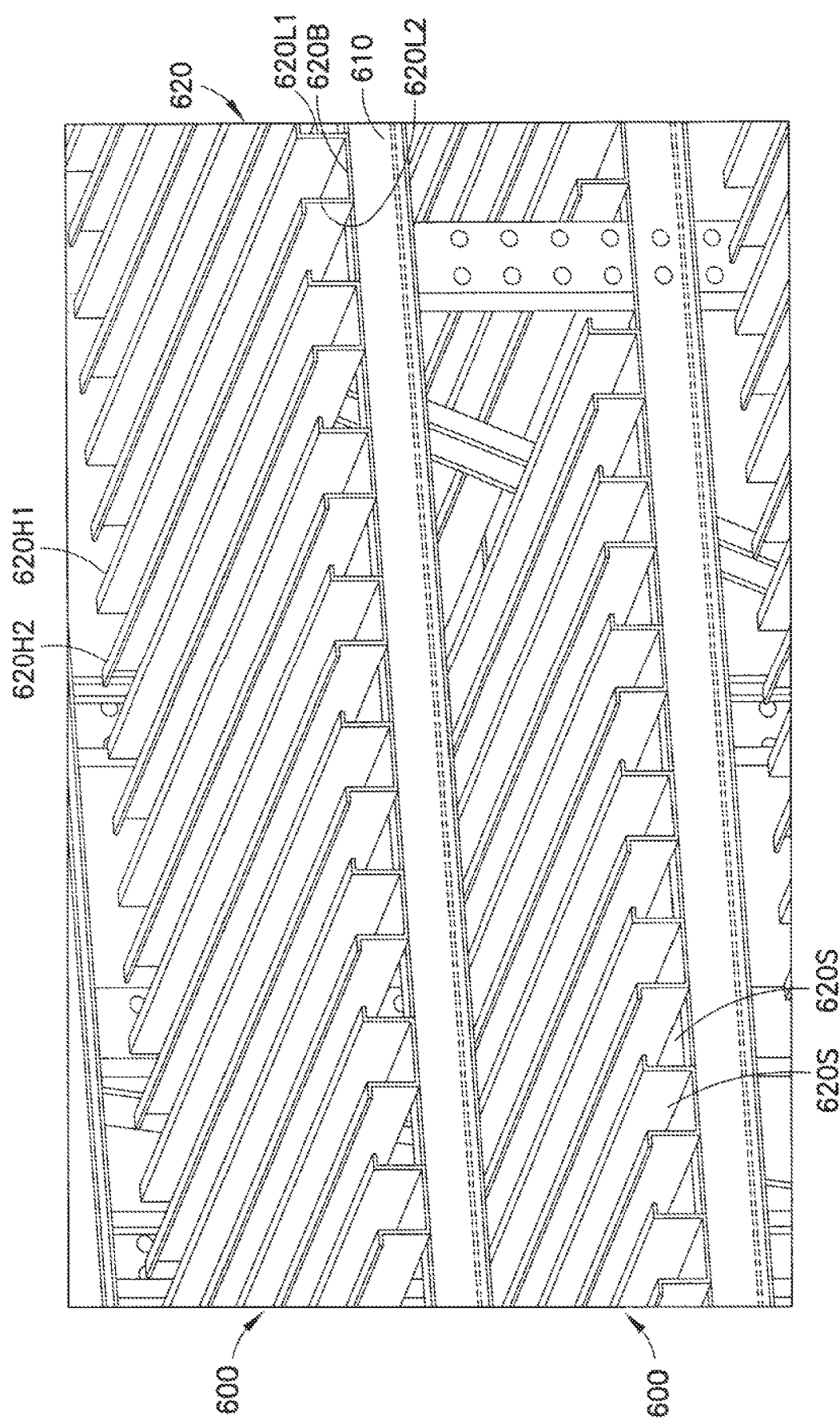

Referring to FIGS. 1, 2A and 2B, the storage structure 130 may hold the picking stock on storage shelves 600 that are separated by picking aisle spaces 130A. In the embodiments the storage shelves 600 may be substantially similar to those described in, for example, U.S. patent application Ser. No. 12/757,220, filed on Apr. 9, 2010 (now U.S. Pat. No. 9,096,375), U.S. patent application Ser. No. 14/816,804, filed on Aug. 3, 2015, U.S. patent application Ser. No. 12/757,381, filed on Apr. 9, 2010 (now U.S. Pat. No. 8,740,538), and U.S. patent application Ser. No. 14/293,556, filed on Jun. 2, 2014 (now U.S. Pat. No. 9,725,239) (which are previously incorporated by reference). For example, the storage shelves 600 may include one or more support legs 620L1, 620L2 extending from, for example, the horizontal supports 610, 611, 613 (which are supported by vertical supports 612). The support legs 620L1, 620L2 may have any suitable configuration and may be part of, for example, a substantially U-shaped channel 620 such that the legs are connected to each other through channel portion 620B. The channel portion 620B may provide an attachment point between the channel 620 and one or more horizontal supports 610, 611, 613. It is noted that each support leg 620L1, 620L2 may also be configured to individually mount to the horizontal supports 610, 611, 613. In the embodiments, each support leg 620L1, 620L2 includes a bent portion 620H1, 620H2 having a suitable surface area configured to support case units stored on the shelves 600. The bent portions 620H1, 620H2 may be configured to substantially prevent deformation of the case units stored on the shelves. The leg portions 620H1, 620H2 may have a suitable thickness or have any other suitable shape and/or configuration for supporting case units stored on the shelves. As can be seen in FIGS. 2A and 2B, the support legs 620L1, 620L2 or channels 620 may form a slatted or corrugated shelf structure where spaces 620S between, for example, the support legs 620L1, 620L2 allow for arms or fingers of the bots 110 to reach into the shelving for transferring case units to and from the shelves. It is also noted that transfer of items to and from the multilevel vertical conveyors 150A, 150B (whether the transfer is made directly or indirectly by the bot 110) may occur in a substantially similar manner to that described above with respect to the storage shelves 600. It is noted that in the embodiments the spacing between the case units on the shelves may be any suitable spacing. It is also noted that transfer of case units to and from the multilevel vertical conveyors 150A, 150B (whether the transfer is made directly or indirectly by the bot 110) may occur in a substantially similar manner to that described above with respect to storage shelves 600.

Figure 3:
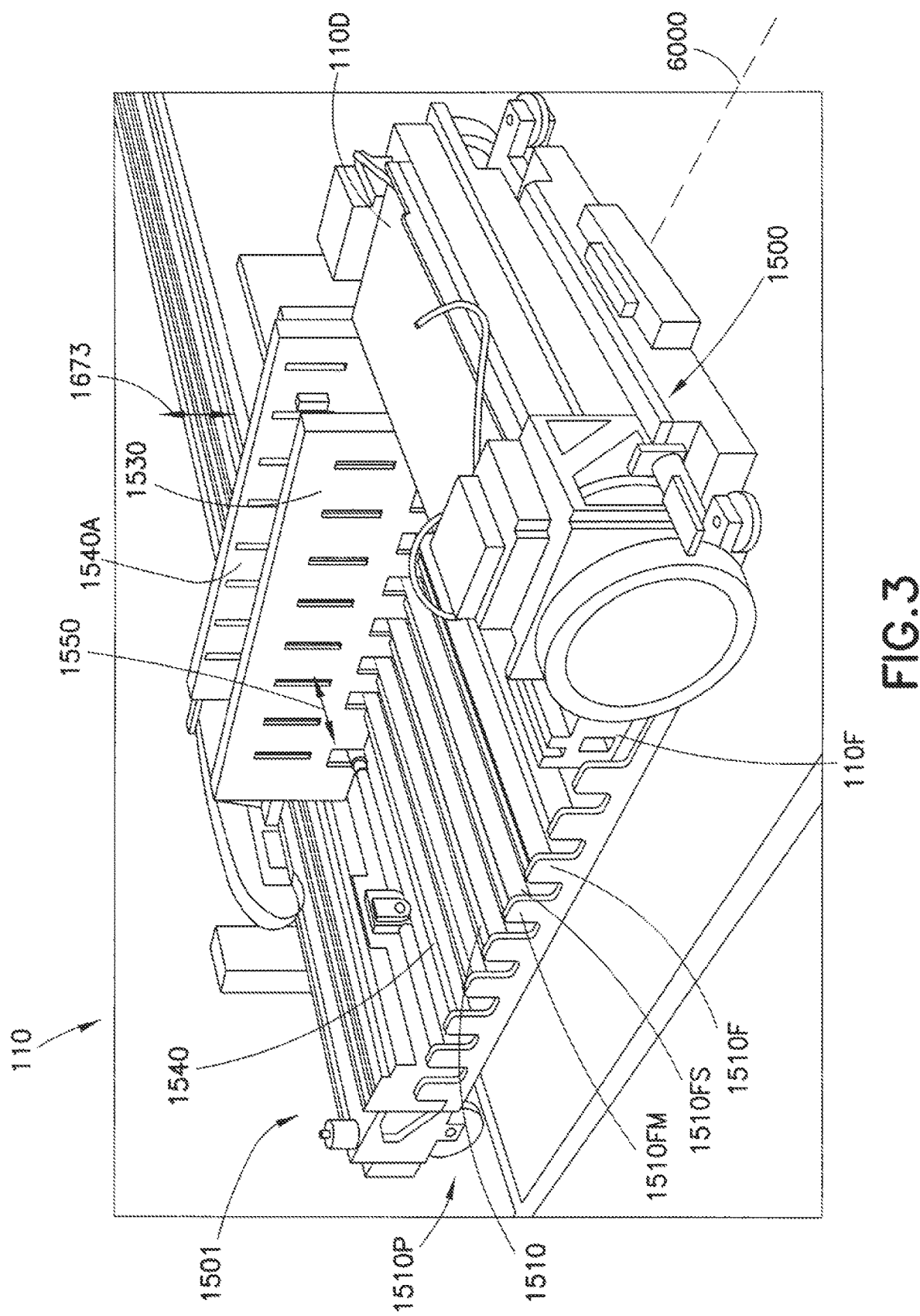
FIG. 3-4 are schematic illustrations of the exemplary autonomous transport vehicle in accordance with aspects of the disclosed embodiment.

Referring to FIG. 3 an exemplary bot 110 is shown. The bot 110 includes a longitudinally extended frame 110F that has a first end 1500 and a second end 1501 where the longitudinal axis 6000 extends from the first end 1500 to the second end 1501. At least one drive section 110D may be coupled to one of the first and/or second ends 1500, 1501 in any suitable manner for driving the bot 110 along the transfer deck(s) 130B and picking aisles 130A (FIG. 1). The drive section 110D may include drive wheels, tracks or any other suitable drive mechanism for effecting travel of the bot along the transfer deck(s) 130B and picking aisles 130A. The other end of the bot 110 may have any suitable supports, such as caster wheels, fixed wheels, steerable wheels, and similar mechanisms for movably supporting the bot 110 as it travels along the transfer deck(s) 130B and picking aisles 130A. The bot 110 may have any suitable controller 1220 (FIG. 1) for effecting operation of the bot 110 (as described herein) and/or communication between the bot 110 and the control server 120 (FIG. 1). As may be realized the configuration of the bot shown in the drawings is merely exemplary and it is noted that the bot may have any suitable configuration for carrying out the detection and positioning of case units relative to the bot 110 as described herein.

The frame 110F of the bot 110 forms a payload bed 1510 that is configured to hold case units (or a pickface where a pickface is one or more cases that are to be picked and carried by the bot 110) or any other suitable payload. The payload bed 1510 may include any suitable pickface support surface. One example, of the pickface support surface is the roller bed described in, for example, U.S. Provisional Patent Application No. 61/423,220, filed on Dec. 15, 2010, U.S. patent application Ser. No. 13/327,040, filed on Dec. 15, 2011 (now U.S. Pat. No. 9,187,244), and U.S. patent application Ser. No. 14/942,717, filed on Nov. 16, 2015 (now U.S. Pat. No. 9,676,551), previously incorporated by reference herein. A fence 1510F may be located at a side opening 1510P of the payload bed 1510. The fence 1510F may be attached to the frame 110F in any suitable manner such as with fasteners or welding. It is noted that the fence 1510F may also form part of the frame 110F or be of unitary construction with the frame 110F. In the embodiments the fence may include slots 1510FS disposed between stopping members 1510FM. The slots 1510FS may be configured to allow fingers 1540 of the bot arm to extend through the fence 1510F between the stopping members 1510FM in a substantially lowered position so that fingers 1540 of a transfer arm 1540A can be, for example, extended into a storage shelf 600 (e.g. between the slats in the storage shelf) below a pickface. The stopping members 1510FM may be configured to extend above the payload bed 1510 to form a barrier that substantially prevents case units from exiting the payload bed 1510 once the case units are positioned on the payload bed 1510. In this example, the number of slots 1510FS is equal to the number of fingers 1540 but it should be understood that in the embodiments the fence 1510F may be configured such that more than one finger 1540 passes through a single slot (e.g. the number of slots is less than the number of fingers). It should be noted that the fence may have any suitable configuration for preventing case units from exiting the payload area when the case units are carried by the bot 110. For example, the fence may be movable so that the stopping members are retractable such that when in an extended configuration the fence prevents the case units from exiting the payload area.

Figure 4:
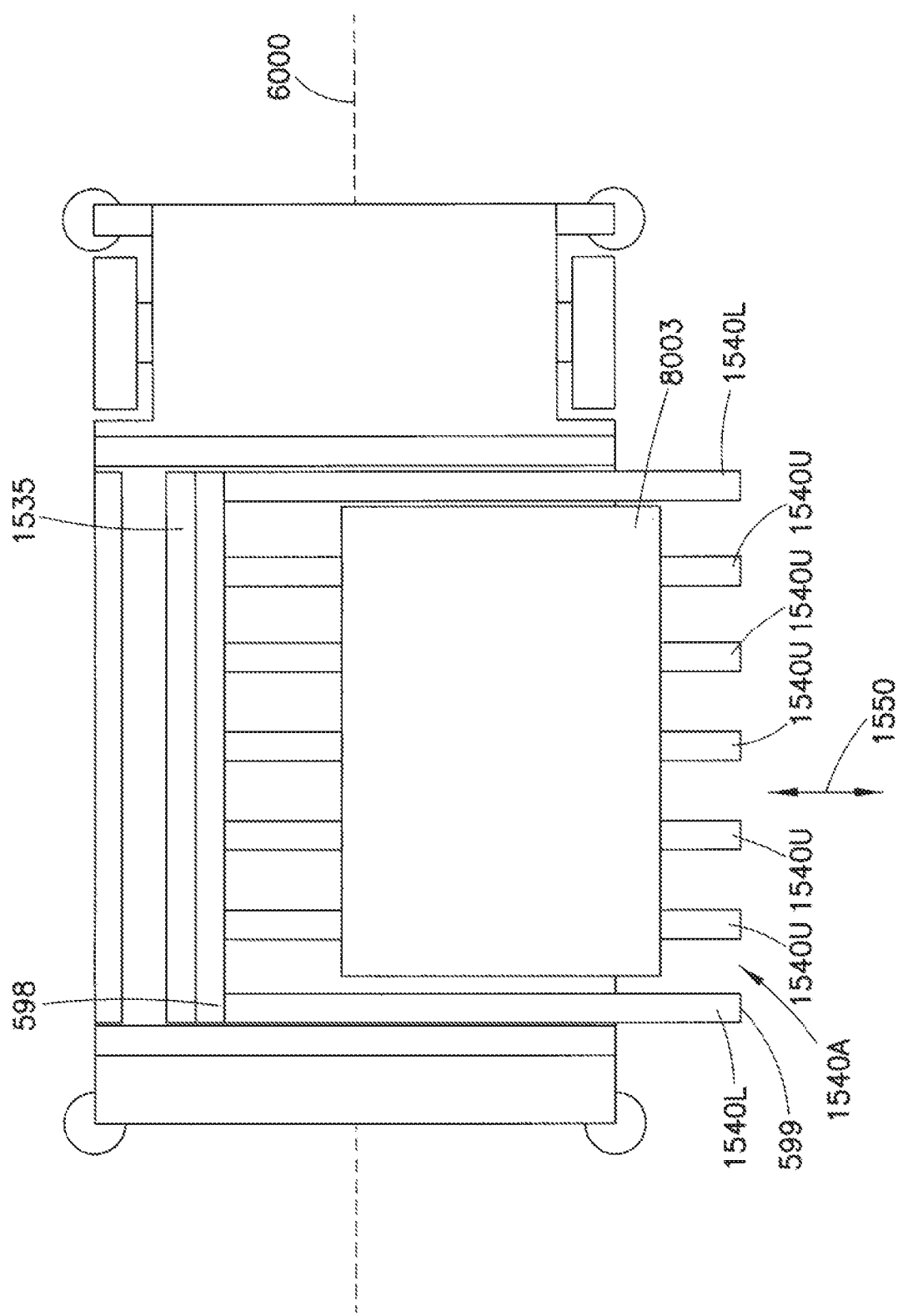
Figure 7:
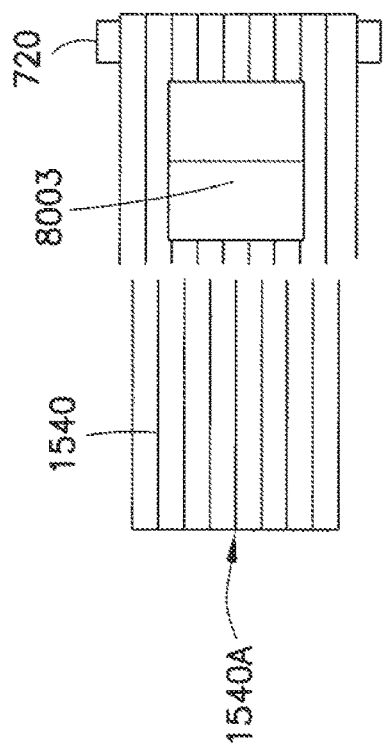
FIG. 7 is a schematic illustration of the interface between a transfer arm of the autonomous transport vehicle of FIGS. 3-4 and a shelf of a conveyor in accordance with the embodiments.

Referring also to FIG. 4, the bot 110 may include a transfer arm or end effector 1540A. The transfer arm 1540A may include fingers 1540 and a finger support or movable member 1535. The fingers 1540 may extend substantially laterally relative to the longitudinal axis 6000 of the bot and be configured to interface with, for example, the slatted shelf structure of the storage shelves 600 (FIGS. 2A and 2B) and the slatted support shelves 720 of the multilevel vertical conveyors (FIG. 7). The fingers 1540 are capable of movement in the direction of arrow 1673 (e.g. in a direction substantially perpendicular to the direction 1550 of extension and retraction of the transfer arm 1540A) between a lowered position and a raised position. It is noted that when in a fully lowered position (e.g. the lowest point of travel allowed by a finger drive unit 1672 in FIG. 5) the fingers 1540 may be disposed below a surface of the payload bed 1510 or the fingers may form at least a portion of the payload bed. When the fingers are in a fully raised position (e.g. the highest point of travel allowed by the finger drive unit 1672) the fingers are located above the fence stopping members 1510FM so that pickfaces can be transferred to and from the payload area of the bot 110. The fingers may be driven by any suitable drive, as described below, for lifting pickfaces disposed on the fingers over the fence 1510F and into/out of the payload bed 1510 of the bot 110.

Figure 5:
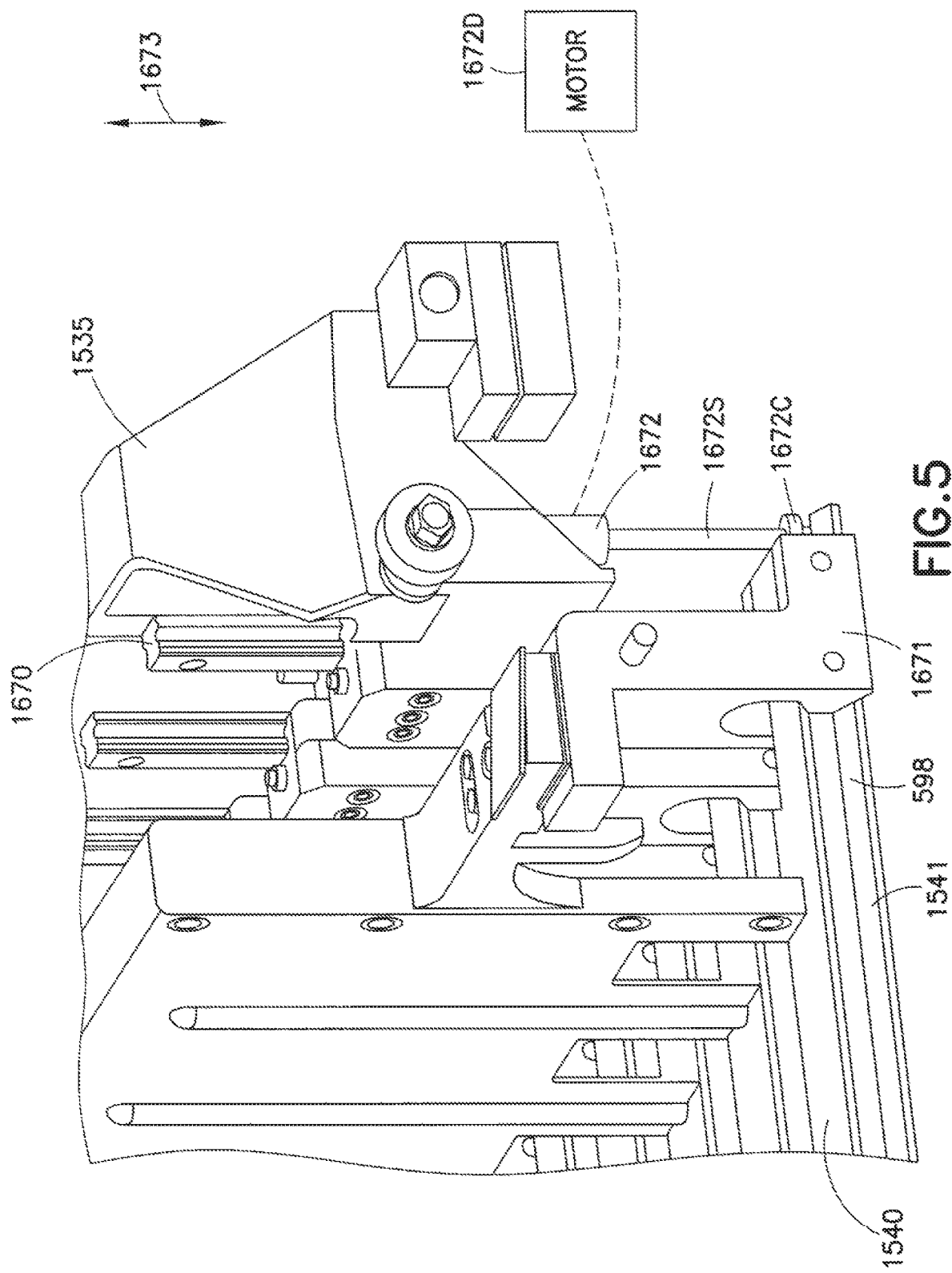
FIGS. 5, 6A and 6B are schematic illustrations of portions of the exemplary autonomous transport vehicle of FIGS. 3-4 in accordance with aspects of the disclosed embodiment.

Referring to FIGS. 4 and 5, each finger 1540 may include a mounting member 1671 and an arm portion 1541 having a first end 598 and a second end 599. The mounting member 1671 may be coupled to the first end 598 of the arm portion 1541 while the second end 599 is distally located from the mounting member 1671. Each finger 1540 may be movably coupled, in a cantilevered manner, to the movable member 1535 so that the fingers may be extended and retracted (e.g. via lateral movement of the movable member 1535) in the direction of arrow 1550 relative to the payload bed 1510 for interacting with, for example, the slats of the storage shelves 600 and the slatted shelves 720 (FIG. 7) of the multilevel vertical conveyors 150A, 150B. For example, the mounting member 1671 of each finger 1540 extends from the first end 598 of the finger 1540. It is noted that while the finger 1540 is shown as being constructed of different parts 1541, 1671, the finger 1540 may have a unitary one-piece construction. The movable member 1535 may include guides 1670 where each mounting member 1671 and a respective guide 1670 are configured such that the mounting member 1671 is slidable along the guide 1670 in the direction of arrow 1673 (e.g. along a lift axis that is substantially perpendicular to the direction 1550 of lateral travel of the transfer arm 1540A). In the embodiments the guides 1670 are shown as rails but it is noted that the guides may be any suitable member for allowing a respective finger 1540 to controllably move relative to, for example, the movable member 1535 in the direction of arrow 1673.

At least one drive unit 1672 may be mounted to the movable member 1535 and be coupled to the first end of one or more fingers 1540 in any suitable manner for driving the one or more fingers along the guides 1670 in the direction of arrow 1673. It is noted that the at least one drive unit 1672 may be coupled to any portion of the one or more fingers 1540 for driving the fingers along guides 1670. In the embodiments, each finger 1540 may have a respective drive unit 1672 so that each finger 1540 can be independently raised and lowered or a single drive unit may drive more than one finger along its respective guide (or e.g. some fingers may individually moveable while others are movable in groups). The drive unit 1672 may be any suitable drive unit capable of driving the finger(s) along the lift axis in the direction of arrow 1673. The drive may include a stepper motor 1672D configured to drive any suitable linear actuator such as, for example, a ball screw 1672S. The drive unit may also include any suitable motor that allows for tracking the number of revolutions or partial revolutions of the motor. It is noted that the drive unit and guide may be incorporated with each other as a unit such as, for exemplary purposes only, a chain/belt and sprocket/pulley where the chain or belt is arranged to carry the finger in the direction of arrow 1673. In the embodiments, each drive unit 1672 may be selectable by, for example, the bot controller 1220 (or any other suitable controller such as for example control server 120) and independently operable for lifting a respective finger 1540. The drive unit 1672 may be coupled to, for example, the first end 598 of the finger 1540 by any suitable coupling 1672C. In the embodiments each drive unit 1672 may be selectably coupled to the respective finger 1540 by releasable couplings (e.g. mechanical, magnetic, etc.) or the drive units 1672 may be substantially permanently coupled to the respective fingers such as through a pivotable, rotatable, or otherwise movable joint or coupling.

Figure 9:
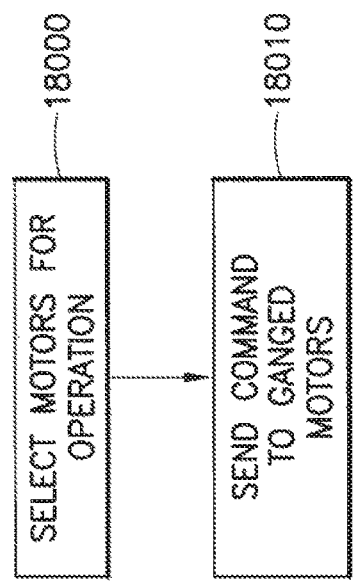
FIG. 9 is a flow diagram in accordance with an aspect of the disclosed embodiment.

Each drive unit 1672 may be suitably connected to, for example, the bot controller 1220 or any other suitable controller (such as for exemplary purposes only the control server 120) for causing lifting movement of the fingers 1540 as described herein. The bot controller 1220 may be configured to selectively actuate each of the drive units 1672 for lifting and lowering any desired number of fingers 1540 in unison. For example, a size of a pickface to be picked by the bot 110 can be determined in any suitable manner, such as through sensors located on the bot or any suitable table or other information stored in a memory of the bot controller 1220, control server 120, warehouse management system 2500 or any other suitable memory. Depending on the size of the pickface, a suitable number of fingers 1540 may be selected for actuation so that the pickface is substantially uniformly supported by the fingers 1540 of the transfer arm 1540A. The controller 1220 may be configured to send start and stop commands to the motors 1672D for the selected fingers 1540 to drive the motors 1672D through the same angle of rotation causing the selected fingers 1540 to be lifted (or lowered) in unison so that the selected fingers 1540 are substantially at the same height and start/stop movement substantially at the same time. It is noted that the motors 1672D may be ganged to the controller 1220 so that the controller 1220 can select which motors 1672D are to be commanded, e.g. placed in an operational state or an idle state (FIG. 9, Block 18000). As may be realized, the ganged connection between the motors 1672D and the controller 1220 allows for operation of the selected motors with but one command signal for starting and stopping the selected motors (FIG. 9, Block 18010). Operation of the motors 1672D with but one start/stop command signal allows the selected motors to start and stop substantially at the same time and hence, generate substantially the same rotation. It is noted that any suitable sensors on the fingers (as will be described below) may provide positional data but this positional data may not be needed for a closed loop position feedback system such as formed by the ganged motors 1672D (e.g. stepper motor feedback) and the controller. In one aspect the finger sensors (described below) may be used to confirm the position of the fingers as determined by the closed loop feedback system. In other aspects the finger sensors may be an open loop system may be used in lieu of or in addition to the closed loop feedback system.

Referring to FIGS. 2-5 and 7, a case unit contact member 1530 may be movably located at least partially within the payload area where the case unit contact member is releasably coupled to the movable member 1535 for causing the extension and retraction of the transfer arm 1540A in the direction of arrow 1550 in the manner described in, for example, U.S. Provisional Patent Application No. 61/423,365 filed on Dec. 15, 2010, U.S. patent application Ser. No. 13/326,952 filed on Dec. 15, 2011, previously incorporated by reference herein. In operation, as the bot 110 is picking or placing pickfaces to the multilevel vertical conveyors 150A, 150B the only items (which in this example is pickface 8003) on the shelf 720 of the conveyor may be those that are picked or placed by the bot 110. On the other hand, when a bot 110 is picking or placing a pickface 8003 to a storage shelf 600, other pickfaces 8001, 8002 may be located adjacent the location 8000 to which the bot is picking from or placing to. As may be realized, the controller 1220 of the bot 110 may be configured to treat the transfer of items from/to the conveyors 150A, 150B different from the transfer of items from/to the storage shelf 600. For example, when transferring pickfaces from/to the conveyors 150A, 150B the bot may cause all of the fingers 1540 of the bot to be lifted above, for example, the fence stop members 1510FM for transferring a pickface. As the only item on the conveyor shelf 720 is the pickface 8003 transferred to/from the bot 110 the lifting and extension of all of the fingers 1540 will not interfere with any other items on the conveyors 150A, 150B. Lifting and extension of all the fingers 1540 would also substantially ensure the distributed support of the pickface 8003 being picked from an inbound conveyor 150A by the fingers 1540 where the position of the pickface on the conveyor shelf 720 may not be known. When transferring pickfaces from/to the storage shelf 600 at, for example, pickface location 8000 lifting of all of the fingers 1540 for extension into the storage shelf 600 may result in contact with pickfaces 8001, 8002 adjacent the location 8000. As may be realized, only the fingers 1540U (FIG. 4) that are supporting the pickface 8003 to be transferred to the shelf 600 may be lifted while the remaining fingers 1540L remain in a substantially lowered position so that as the pickface 8003 is transferred to pickface location 8000 the fingers 1540L not supporting the pickface 8003 are inserted into the shelf 600 beneath (and do not contact) the pickfaces 8001, 8002. It is noted that in the embodiments the storage shelves and/or conveyor shelves may be configured such that the extension of the transfer arm 1540A may be treated the same for the transfer of case units between the bot and both of the storage shelves and the multilevel vertical conveyors.

Figure 6A:
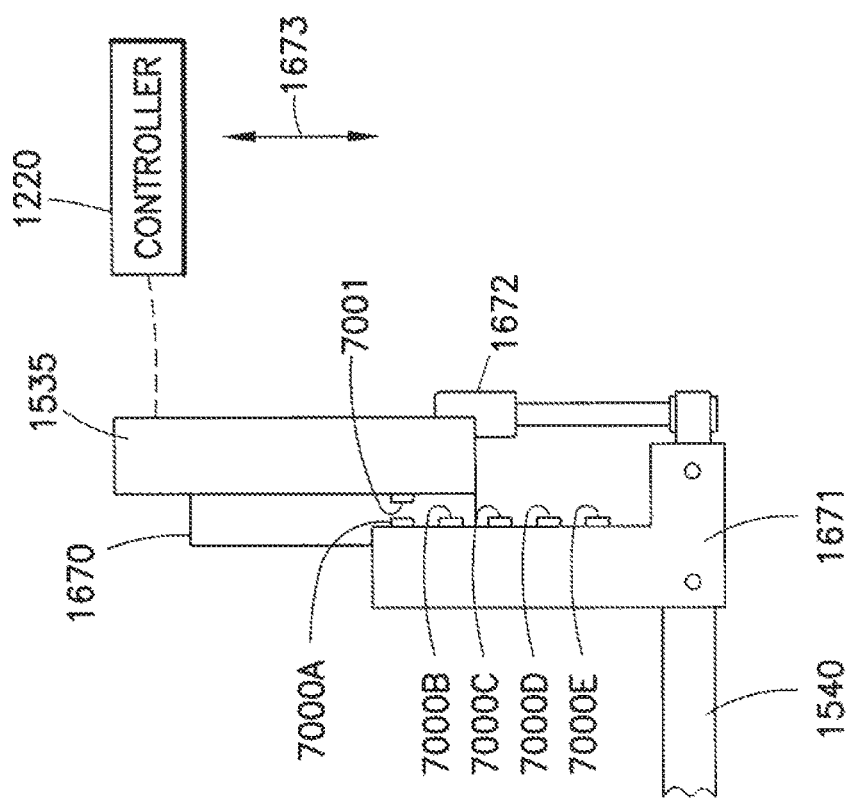

The lift position or height of each of the fingers 1540 can be determined in any suitable manner. Referring to FIG. 6A, a lift position sensor may be positioned alongside the lift axis of one or more fingers 1540 for determining/tracking a position of the one or more fingers 1540. The lift position sensor may include a registration device 7000 and one or more detection devices 7001A-7001E. In one example, the registration device 7000 may be mounted to the mounting member 1671 and one or more detecting devices 7001A-7001E may be mounted to movable member 1535. In the embodiments the registration device and detecting devices may be beam (or optical) sensors, capacitive or inductive sensors, or any other suitable type of sensor that will allow for detection of the movement of the mounting member 1671 relative to, for example the movable member 1535. For exemplary purposes only, the registration device 7000 may be a reflective flag in the case of an optical sensor and magnetic/electrical members in the case of capacitance or inductance sensors. It is noted that in the embodiments the registration devices may be any suitable devices that are capable of being detected by the detection devices. The detection devices 7001A-7001E may be spaced apart from each other along the movable member to divide the travel of travel through which the drive unit 1672 drives the fingers 1540. The controller 1220, for example, may be connected to one or more of the registration device 7000 and detecting devices 7001A-7001E and be configured to receive signals from these devices for detecting a position of each of the fingers 1540 as signals from the sensors transition from one detector to the next. As may be realized, while four regions of travel are defined in this example by the five detectors 7001A-7001E, it is noted that any suitable number of detectors may be used so that any suitable number of regions of travel are defined (e.g. two detectors can be used to define a region of travel including the full lift stroke of the fingers while additional detectors may be added to provide stopping points between the upper and lower extremes of the full lift stroke). As may also be realized the signal received by the controller may have a toothed or otherwise sine wave like profile that, for example, has a high value when the registration device 7000 is adjacent one of the detecting devices 7001A-7001E and a low value when the registration device 7000 is between adjacent detecting devices 7001A-7001E.

In one example, when the fingers 1540 selected for activation are substantially at the lowest position (so that the fingers are located beneath the payload bed 1510) the registration device(s) 7000 may be positioned adjacent the detector(s) 7001E. For example, as the drive unit 1672 is actuated to move the selected fingers in the direction of arrow 1673 and the registration device(s) 7000 becomes adjacent detector(s) 7001E, a high signal may be sent from the detector(s) 7001E (while the other detectors 7001A-7001D are providing a low signal) to the controller 1220 for a determination that the selected fingers 1540 are at the lowest position. When the controller 1220 receives the signal from detector(s) 7001E the controller 1220 may send a command to the drive units 1672 for the selected fingers 1540 so that the drive units 1672 are stopped such that the fingers 1540 are located substantially at their lowest position. Similarly, for example, as the drive units 1672 are actuated to move the finger in the direction of arrow 1673 and the registration device(s) 7000 becomes adjacent detector(s) 7001A (e.g. the fingers are substantially at the highest position so that the fingers are above the fence stop members 1510FM for transporting pickfaces to and from the payload bed 1510) a high signal may be sent from the detector(s) 7001A (while the other detectors 7001B-7001E provide a low signal) to the controller 1220 for a determination that the fingers 1540 are at their highest position. When the controller 1220 receives the signal from detector(s) 7001A the controller 1220 may send a command to the drive units 1672 for the selected fingers 1540 so that the drive units 1672 are stopped such that the fingers 1540 are located substantially at their highest position. As may be realized, other detectors 7001B-7001D may be positioned between the detectors 7001A, 7001E to provide other heights at which the fingers can be stopped in the manner described above.

Figure 6B:
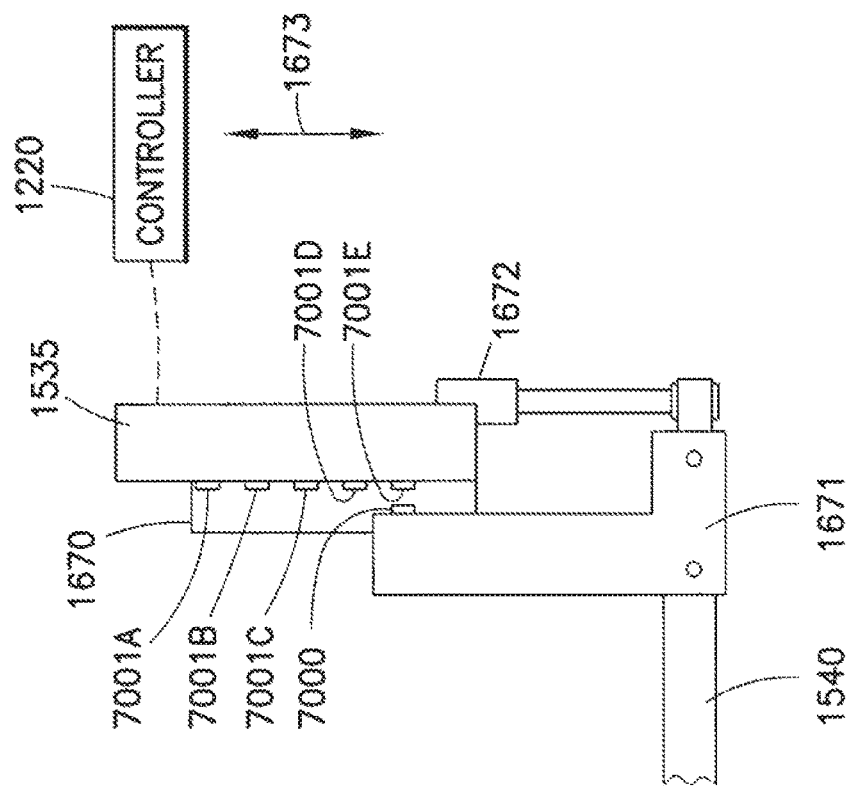

Referring to FIG. 6B, a single detector 7001 may be placed on the movable member 1535 and one or more registration members 7000A-7000E may be placed on the mounting member 1671 adjacent one or more fingers 1540. As the selected finger(s) 1540 are moved in the direction of arrow 1673 a signal may be sent to the controller 1220 by the detector 7001 when each of the registration members 7000A-7000E becomes adjacent the detector 7001. The controller 1220 may be configured to count or otherwise track which registration member 7000A-7000E is adjacent the detector 7001 (such as in the manner described above with respect to FIG. 6A) and send suitable commands to the drive unit(s) 1672 for stopping the finger(s) 1540 at a desired predetermined position (e.g. when the fingers are at their highest position for transferring pickfaces to and from the payload bed, when the fingers are at their lowest position beneath the payload bed, or any suitable position therebetween). It is noted that any suitable combination and types of registration members and detectors may be mounted to any suitable portions of the bot 110 and used for determining the lift height of the fingers 1540.

It is also noted that the location of each of the fingers in the direction of arrow 1673 along the lift axis may be determined from drive unit feedback. For example, each drive unit 1672 may be configured to send signals to the controller 1220 for counting the number of revolutions (or a portion thereof) that the drive unit makes. The controller 1220 may also be configured to track the number of pulses used to drive, for example, the stepper motor drive unit 1672. As may be realized any suitable motor feedback or other information can be used to determine the lift position of each of the fingers 1540.

Figure 8A:
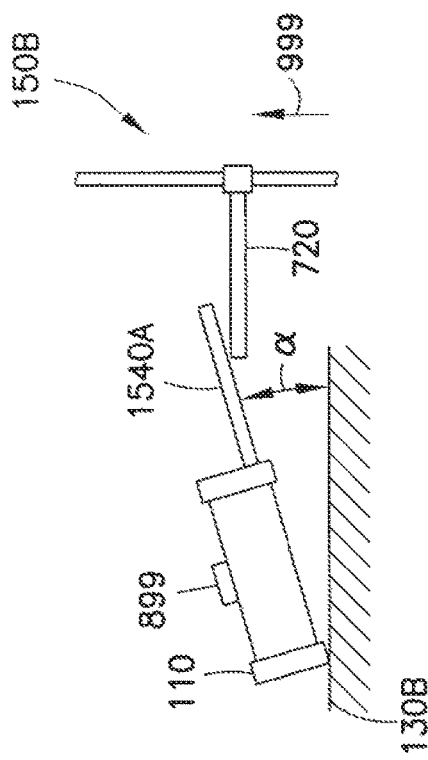
FIGS. 8A and 8B are schematic illustrations of autonomous transport vehicle tilt detection in accordance with an aspect of the disclosed embodiment.
Figure 8B:
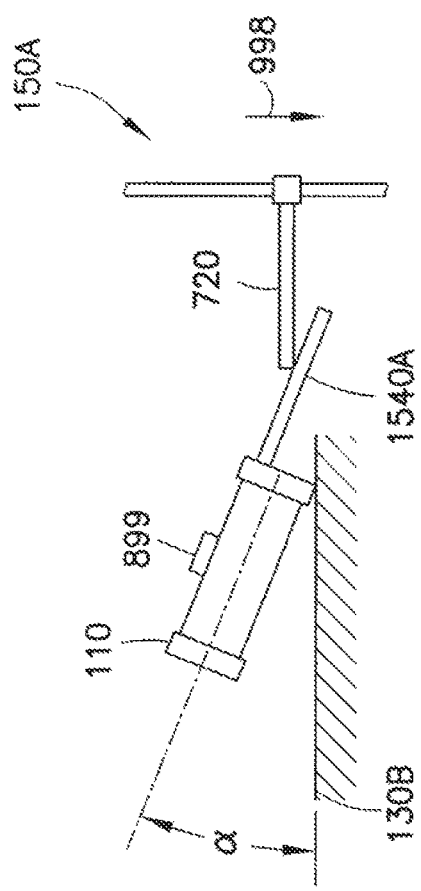

Referring to FIGS. 1, 8A and 8B the bot 110 may include any suitable inertial sensor 899 for detecting, for example, a tilt α of the bot 110 from a horizontal plane, such as when the bot is located at a transfer station of the transfer deck 130B. The inertial sensor 899 may allow for the stopping of a multilevel vertical conveyor 150A, 150B if contact is made between the bot and the conveyor or a case carried by the bot and the conveyor (or vice versa) such that the bot 110 tilts beyond a predetermined angle. FIG. 8A illustrates contact between the bot transfer arm 1540A and the shelf 720 of an inbound multilevel vertical conveyor 150A (due to, for exemplary purposes only, a misalignment between fingers of the bot arm and the fingers of the conveyor shelf) such that the motion of the shelf 720 in the direction of arrow 998 causes the bot to tilt. Another instance that may cause the bot to tilt is if the bot arm 1540A is extended too early and a case on either the bot arm or the conveyor shelf prevents the fingers of the bot arm and conveyor shelf from inter-meshing with one another. The inertial sensor 899 may detect the tilt a and send a signal to, for example, the bot controller 1220. The bot controller 1220 may send a corresponding signal to the control server 120 where the control server is configured to stop movement of the conveyor 150A. It is noted that the inertial sensor 899 may also be configured to send a signal directly to the control server 120. The control server 120 may communicate with the bot 110 and be configured to track the position of the bot 110 throughout the storage and retrieval system 100 (as described in, for example, U.S. patent application Ser. No. 12/757,337 filed on Apr. 9, 2010 (now U.S. Pat. No. 8,594,835), U.S. patent application Ser. No. 14/089,434 filed on Nov. 25, 2013 (now U.S. Pat. No. 9,051,120) and U.S. patent application Ser. No. 14/733,341 filed on Jun. 8, 2015, the disclosures of previously incorporated by reference herein) such that the conveyor 150A interacting with the tilting bot 110 can be identified and stopped. In response to the inertial sensor 899 detecting the tilt α of the bot 110, the bot controller 1220 may cause the transfer arm 1540A to be retracted so that the bot 110 can free itself from contact with the conveyor 150A and restore itself to a horizontal orientation. FIG. 8B illustrates contact between the bot transfer arm 1540A and the shelf 720 of an outbound multilevel vertical conveyor 150B such that the motion of the shelf 720 in the direction of arrow 998 causes the bot to tilt in a direction opposite that of FIG. 8A. Stopping of the outbound multilevel vertical conveyor 150B and retraction of the transfer arm 1540A may occur in substantially the same manner as that described above so that the bot 110 can free itself from contact with the outbound multilevel vertical conveyor 150B. It is noted that the bot 110 may be configured to time out (e.g. halt operation) upon detection that the tile α of the bot 110 has exceeded a predetermined amount of tilt so that any suitable corrective action can be taken such as the retracting of the transfer arm described above or to allow for manual intervention.

In accordance with a first aspect of the disclosed embodiments, an autonomous transport vehicle is provided. The transport vehicle includes a transfer arm including at least one finger and a movable finger support member, the at least one finger being movably coupled to the finger support member so that the finger support member moves in a first direction and the at least one finger moves relative to the finger support member in a second direction substantially perpendicular to the first direction. The autonomous transport vehicle includes at least one sensor configured to detect movement of the at least one finger, the at least one sensor having a registration member and a detection member where one of the registration member and detection member is mounted to each of the at least one finger so as to be movable with a respective one of the at least one finger and the other one of the registration member and detection member is stationary relative to the at least one finger. The autonomous transport vehicle including a controller in communication with the at least one sensor, the controller being configured to determine a position of the at least one finger along the second direction based on a proximity of the registration member relative to the detection member.

In accordance with the first aspect of the disclosed embodiments, the other one of the registration member and detection member is mounted on the movable finger support.

In accordance with the first aspect of the disclosed embodiments, the at least one sensor is an optical, capacitive or inductive sensor.

In accordance with the first aspect of the disclosed embodiments, the registration member comprises a reflective flag or a magnetic source.

In accordance with the first aspect of the disclosed embodiments, the autonomous transport vehicle includes a drive unit for each of the at least one finger, where the controller is configured to actuate the drive unit for each of the at least one finger so each of the at least one finger are moved along the second direction substantially in unison.

In accordance with the first aspect of the disclosed embodiments, the drive unit for each of the at least one finger includes a stepper motor.

In accordance with the first aspect of the disclosed embodiments, the controller is configured to selectively move each of the at least one finger along the second direction depending on a size of a pickface carried by the autonomous transport vehicle.

In accordance with the first aspect of the disclosed embodiments, the autonomous transport vehicle includes an inertial sensor coupled to the controller, the inertial sensor being configured to detect a tilt of the autonomous transport vehicle relative to a horizontal plane.

In accordance with a second aspect of the disclosed embodiments, a storage and retrieval system is provided, the storage and retrieval system having at least one multilevel vertical conveyor and at least one autonomous transport vehicle, the at least one autonomous transport vehicle including a controller and an inertial sensor configured to detect a tilt of the autonomous transport vehicle when the autonomous transport vehicle contacts a moving shelf of the at least one multilevel vertical conveyor, when the tilt exceeds a predetermined amount of tilt the controller is configured to at least in part effect stopping movement of the multilevel vertical conveyor.

In accordance with the second aspect of the disclosed embodiments, the storage and retrieval system further includes a control server in communication with the controller of the autonomous transport vehicle, the control server being configured to receive a signal from the controller regarding the tilt of the autonomous transport vehicle and to stop movement of the multilevel vertical conveyor.

In accordance with the second aspect of the disclosed embodiments, the autonomous transport vehicle further includes a transport arm for interacting with a moving shelf of the multilevel vertical conveyor, the controller being configured to cause a retraction of the transport arm substantially upon detection of the tilt exceeding the predetermined amount of tilt.

In accordance with a third aspect of the exemplary embodiments an autonomous transport vehicle is provided. The autonomous transport vehicle includes a transfer arm having a finger support member and a plurality of fingers movable coupled to the finger support member. The autonomous transport vehicle further includes a drive unit coupled to each of the plurality of fingers for independently moving a respective finger relative to the finger support member and a controller connected to each of the drive units for selectively actuating the drive units such that a single start or stop command from the controller causes activation or deactivation of the selected drive units in unison.

In accordance with the third aspect of the exemplary embodiments, each of the drive units includes a stepper motor and a linear actuator where the stepper motor is coupled to a respective one of the plurality of fingers through the linear actuator.

In accordance with the third aspect of the exemplary embodiments, the linear actuator comprises a ball screw.

In accordance with the third aspect of the exemplary embodiments, wherein one or more of the plurality of fingers includes a sensor connected to the controller, the sensor being configured to send a signal to the controller indicating the one or more of the plurality of fingers are located at a predetermined position relative to the finger support member.

In accordance with the third aspect of the exemplary embodiments, the controller is configured to stop movement of the one or more of the plurality of fingers upon receipt of the signal indicating the one or more of the plurality of fingers are located at a predetermined position relative to the finger support member.

It should be understood that the exemplary embodiments disclosed herein can be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method for operating an automated storage and retrieval system, the method comprising:
providing a storage space with at least one level having at least one storage rack with rack storage locations;
providing at least one autonomous transport vehicle having a transfer arm including at least one finger and a movable finger support member, the at least one finger being movably coupled to the movable finger support member, the at least one autonomous transport vehicle and the at least one storage rack being disposed so as to define random access storage to each rack storage location of the at least one storage rack;
moving the movable finger support member in a first direction relative to a reference frame of the at least one autonomous transport vehicle and moving the at least one finger linearly relative to the movable finger support member in a second direction substantially perpendicular to both the first direction in the reference frame of the at least one autonomous transport vehicle and a travel surface on which the at least one autonomous transport vehicle travels, the at least one finger having incremental indexed positions between ends of the range of motion in the second direction where the incremental indexed positions between ends of the range of motion set different incremental indexed positions of the at least one finger in the second direction; and
setting, with a controller, an incremental indexed position of the at least one finger to one of the incremental indexed positions between ends of the range of motion in the second direction that is different than the incremental indexed position set for another of the at least one finger movably coupled to the movable finger support member so as to selectably vary a size of the transfer arm based on a pickface size of a pickface transferred to and from the rack storage locations.

2. The method of claim 1, further comprising detecting, with at least one sensor, movement of the at least one finger in the second direction relative to the movable finger support member, where the at least one sensor includes a registration member and a detection member where one of the registration member and detection member is mounted to each of the at least one finger so as to be linearly movable with and by movement of a respective one of the at least one finger and the other one of the registration member and detection member is stationary relative to the at least one finger.

3. The method of claim 2, wherein the at least one sensor is an optical, capacitive, or inductive sensor.

4. The method of claim 2, wherein the registration member comprises a reflective flag or a magnetic source.

5. The method of claim 1, further comprising:
providing the autonomous transport vehicle with a drive unit for each of the at least one finger; and actuating, with the controller, the drive unit for each of the at least one finger so each of the at least one finger are moved along the second direction substantially in unison.

6. The method of claim 5, wherein the drive unit for each of the at least one finger includes a stepper motor.

7. The method of claim 1, further comprising:
providing the autonomous transport vehicle with an inertial sensor coupled to the controller; and
detecting, with the inertial sensor, a tilt of the autonomous transport vehicle relative to a horizontal plane.

8. An autonomous transport vehicle comprising:
a transfer arm including at least one finger and a movable finger support member, the at least one finger being movably coupled to the movable finger support member so that the movable finger support member moves in a first direction relative to a reference frame of the autonomous transport vehicle and the at least one finger moves linearly relative to the movable finger support member in a second direction substantially perpendicular to both the first direction in the reference frame of the autonomous transport vehicle and a travel surface on which the autonomous transport vehicle travels;

incremental indexed positions, of the at least one finger, between ends of the range of motion in the second direction where the incremental indexed positions between ends of the range of motion set different incremental indexed positions of the at least one finger in the second direction, a controller configured to set an incremental indexed position of the at least one finger to one of incremental indexed positions between ends of the range of motion in the second direction that is different than the incremental indexed position set for another of the at least one finger movably coupled to the movable finger support member so as to selectably vary a size of the transfer arm based on a pickface size of a pickface transferred to and from rack storage locations of at least one storage rack of a storage space; and wherein the autonomous transport vehicle and the at least one storage rack, with the rack storage locations, of the storage space are disposed so as to define random access storage to each rack storage location of the at least one storage rack.

9. The autonomous transport vehicle of claim 8, further comprising at least one sensor configured to detect movement of the at least one finger in the second direction relative to the movable finger support member, where the at least one sensor includes a registration member and a detection member where one of the registration member and detection member is mounted to each of the at least one finger so as to be linearly movable with and by movement of a respective one of the at least one finger and the other one of the registration member and detection member is stationary relative to the at least one finger.

10. The autonomous transport vehicle of claim 9, wherein the at least one sensor is an optical, capacitive, or inductive sensor.

11. The autonomous transport vehicle of claim 9, wherein the registration member comprises a reflective flag or a magnetic source.

12. The autonomous transport vehicle of claim 8, further comprising a drive unit for each of the at least one finger, where the controller is configured to actuate the drive unit for each of the at least one finger so each of the at least one finger are moved along the second direction substantially in unison.

13. The autonomous transport vehicle of claim 12, wherein the drive unit for each of the at least one finger includes a stepper motor.

14. The autonomous transport vehicle of claim 8, further comprising an inertial sensor, coupled to the controller, where the inertial sensor is configured to detect a tilt of the autonomous transport vehicle relative to a horizontal plane.

\* \* \* \* \*